United States Patent
Mishina et al.

(10) Patent No.: US 11,886,780 B2
(45) Date of Patent: Jan. 30, 2024

(54) OPTIMIZATION DEVICE, OPTIMIZATION DEVICE CONTROL METHOD, AND COMPUTER-READABLE RECORDING MEDIUM RECORDING OPTIMIZATION DEVICE CONTROL PROGRAM

(71) Applicant: FUJITSU LIMITED, Kawasaki (JP)

(72) Inventors: Takeshi Mishina, Kawasaki (JP); Yoshimasa Tani, Kawasaki (JP); Satoshi Matsuura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 589 days.

(21) Appl. No.: 17/179,458

(22) Filed: Feb. 19, 2021

(65) Prior Publication Data
US 2021/0173978 A1   Jun. 10, 2021

Related U.S. Application Data

(63) Continuation of application No. PCT/JP2018/034233, filed on Sep. 14, 2018.

(51) Int. Cl.
*G06F 30/20* (2020.01)
*G06N 7/08* (2006.01)
*G06F 119/06* (2020.01)

(52) U.S. Cl.
CPC .......... *G06F 30/20* (2020.01); *G06N 7/08* (2013.01); *G06F 2119/06* (2020.01)

(58) Field of Classification Search
CPC ........ G06F 30/20; G06F 2119/06; G06N 7/08
See application file for complete search history.

(56) References Cited

U.S. PATENT DOCUMENTS

| | | |
|---|---|---|
| 5,165,009 A | 11/1992 | Watanabe et al. |
| 2016/0062951 A1* | 3/2016 | Yoshimura ............. G11C 19/08 708/190 |

(Continued)

FOREIGN PATENT DOCUMENTS

| | | |
|---|---|---|
| JP | H03-0250244 A | 11/1991 |
| JP | 2018-041351 A | 3/2018 |
| WO | 2017/037903 A1 | 3/2017 |

OTHER PUBLICATIONS

Extended European Search Report dated Sep. 1, 2021 for corresponding European Patent Application No. 18933180.4, 10 pages.

(Continued)

*Primary Examiner* — Chuen-Meei Gan
(74) *Attorney, Agent, or Firm* — Fujitsu Intellectual Property Center

(57) ABSTRACT

An optimization device includes: a memory; and a processor and configured to: store a coefficient indicating magnitude of an interaction between bits in a bit string representing a state of an Ising model; output, when any bit in the bit string is inverted, a signal indicating inversion availability of an own bit according to calculation of energy change in the Ising model using the coefficient corresponding to the inverted bit and the own bit read from the memory as bit operations; output a signal indicating a bit to be inverted in the bit string selected on the basis of the signal indicating inversion availability output from bit operations of a first number of bits of the bit string, of the bit operations; and change the first number of bits and change a second number of bits of the coefficient for each bit operations of the first number of bits.

12 Claims, 24 Drawing Sheets

(56) References Cited

U.S. PATENT DOCUMENTS

| | | | |
|---|---|---|---|
| 2016/0063391 A1* | 3/2016 | Hayashi | G06F 7/588 |
| | | | 706/11 |
| 2016/0118106 A1* | 4/2016 | Yoshimura | G11C 7/04 |
| | | | 365/156 |
| 2018/0075342 A1 | 3/2018 | Tamura et al. | |

OTHER PUBLICATIONS

Canadian Office Action dated Feb. 24, 2022 for corresponding Canadian Patent Application No. 3109735, 7 pages.

International Search Report and Written Opinion of the International Searching Authority (Form PCT/ISA/210, 220, and 237), mailed in connection with PCT/JP2018/034233 dated Dec. 4, 2018 (Total 9 pages).

* cited by examiner

EXAMPLE OF COMBINATIONAL OPTIMIZATION PROBLEM

FIG. 14

LFE0 — 4d1

| $W_{0,8191}$ | $W_{0,8190}$ | $W_{0,8189}$ | $W_{0,8188}$ |
|---|---|---|---|
| $W_{0,8187}$ | $W_{0,8186}$ | $W_{0,8185}$ | $W_{0,8184}$ |
| ... | ... | ... | ... |
| $W_{0,7}$ | $W_{0,6}$ | $W_{0,5}$ | $W_{0,4}$ |
| $W_{0,3}$ | $W_{0,2}$ | $W_{0,1}$ | $W_{0,0}$ |
| 63 | 47 | 31 | 15 |

LFE1 — 4d2

| $W_{1,8191}$ | $W_{1,8190}$ | $W_{1,8189}$ | $W_{1,8188}$ |
|---|---|---|---|
| $W_{1,8187}$ | $W_{1,8186}$ | $W_{1,8185}$ | $W_{1,8184}$ |
| ... | ... | ... | ... |
| $W_{1,7}$ | $W_{1,6}$ | $W_{1,5}$ | $W_{1,4}$ |
| $W_{1,3}$ | $W_{1,2}$ | $W_{1,1}$ | $W_{1,0}$ |
| 63 | 47 | 31 | 15 |

⋮

LFE8191 — 4dn

| $W_{8191,8191}$ | $W_{8191,8190}$ | $W_{8191,8189}$ | $W_{8191,8188}$ |
|---|---|---|---|
| $W_{8191,8187}$ | $W_{8191,8186}$ | $W_{8191,8185}$ | $W_{8191,8184}$ |
| ... | ... | ... | ... |
| $W_{8191,7}$ | $W_{8191,6}$ | $W_{8191,5}$ | $W_{8191,4}$ |
| $W_{8191,3}$ | $W_{8191,2}$ | $W_{8191,1}$ | $W_{8191,0}$ |
| 63 | 47 | 31 | 15 |

SCALE: 8 kBITS
PRECISION: 16 BITS
NUMBER OF LFEs: 8k

SCALE: 4 kBITS
PRECISION: 64 BITS
NUMBER OF LFEs: 8k

OPTIMIZATION DEVICE, OPTIMIZATION DEVICE CONTROL METHOD, AND COMPUTER-READABLE RECORDING MEDIUM RECORDING OPTIMIZATION DEVICE CONTROL PROGRAM

CROSS-REFERENCE TO RELATED APPLICATION

This application is a continuation application of International Application PCT/JP2018/034233 filed on Sep. 14, 2018 and designated the U.S., the entire contents of which are incorporated herein by reference.

FIELD

The embodiment relates to an optimization device, an optimization device control method, and an optimization device control program.

BACKGROUND

As a method of solving a multivariable optimization problem that a von Neumann computer is not good at, there is an optimization device (sometimes referred to as an Ising machine or a Boltzmann machine) using an Ising energy function. The optimization device performs calculation by replacing a problem to be calculated with an Ising model that is a model representing behavior of spins of magnetic material.

Related art is disclosed in International Publication Pamphlet No. WO 2017/037903/

SUMMARY

According to an aspect of the embodiments, an optimization device includes: a memory; and a processor coupled to the memory and configured to: store a coefficient indicating magnitude of an interaction between bits in a bit string representing a state of an Ising model; output, when any bit in the bit string is inverted, a signal indicating inversion availability of an own bit according to calculation of energy change in the Ising model using the coefficient corresponding to the inverted bit and the own bit read from the memory as a plurality of bit operations; output a signal indicating a bit to be inverted in the bit string selected on the basis of the signal indicating inversion availability output from each of bit operations of a first number of bits of the bit string, of the plurality of bit operations, to each of the bit operations of the first number of bits; and change the first number of bits and change a second number of bits of the coefficient for each of the bit operations of the first number of bits.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating a storage example of weight coefficients (No. 4).

DESCRIPTION OF EMBODIMENTS

The optimization device can also be modeled using, for example, a neural network. In that case, each of a plurality of bits (spin bits) corresponding to a plurality of spins included in the Ising model functions as a neuron that outputs 0 or 1 depending on a weight coefficient (also referred to as a coupling coefficient) indicating magnitude of an interaction between another bit and an own bit. The optimization device obtains, as a solution, a combination of each value of bits in which the minimum value of values (referred to as energy) of the above-described energy function (also referred to as a cost function or an objective function) is obtained, by a stochastic search method such as simulated annealing, for example.

For example, there is a proposal of a semiconductor system for searching for a ground state of an Ising model using a semiconductor chip equipped with a plurality of unit elements corresponding to spins. In the proposed semiconductor system, a plurality of semiconductor chips equipped with a certain number of unit elements is used for construction in implementing a semiconductor chip capable of handling a large-scale problem.

In the optimization device, the number of spin bits used (corresponding to the scale of the problem) and the number of bits of the weight coefficient (corresponding to the precision of a conditional expression in the problem) can change depending on the problem to be solved. For example, in a problem in a certain field, a relatively large number of spin bits may be used and a relatively small number of bits of the weight coefficient may be used. Meanwhile, in a problem in another field, a relatively small number of spin bits may be used and a relatively large number of bits of the weight coefficient may be used. However, it is inefficient to individually manufacture, for each problem, an optimization device provided with the number of spin bits and the number of bits of the weight coefficient suitable for each problem.

In one aspect, an object of the present invention is to provide an optimization device, an optimization device control method, and an optimization device control program capable of varying scale and precision.

Hereinafter, the present embodiment will be described with reference to the drawings.

First Embodiment

A first embodiment will be described.

Figure 1:
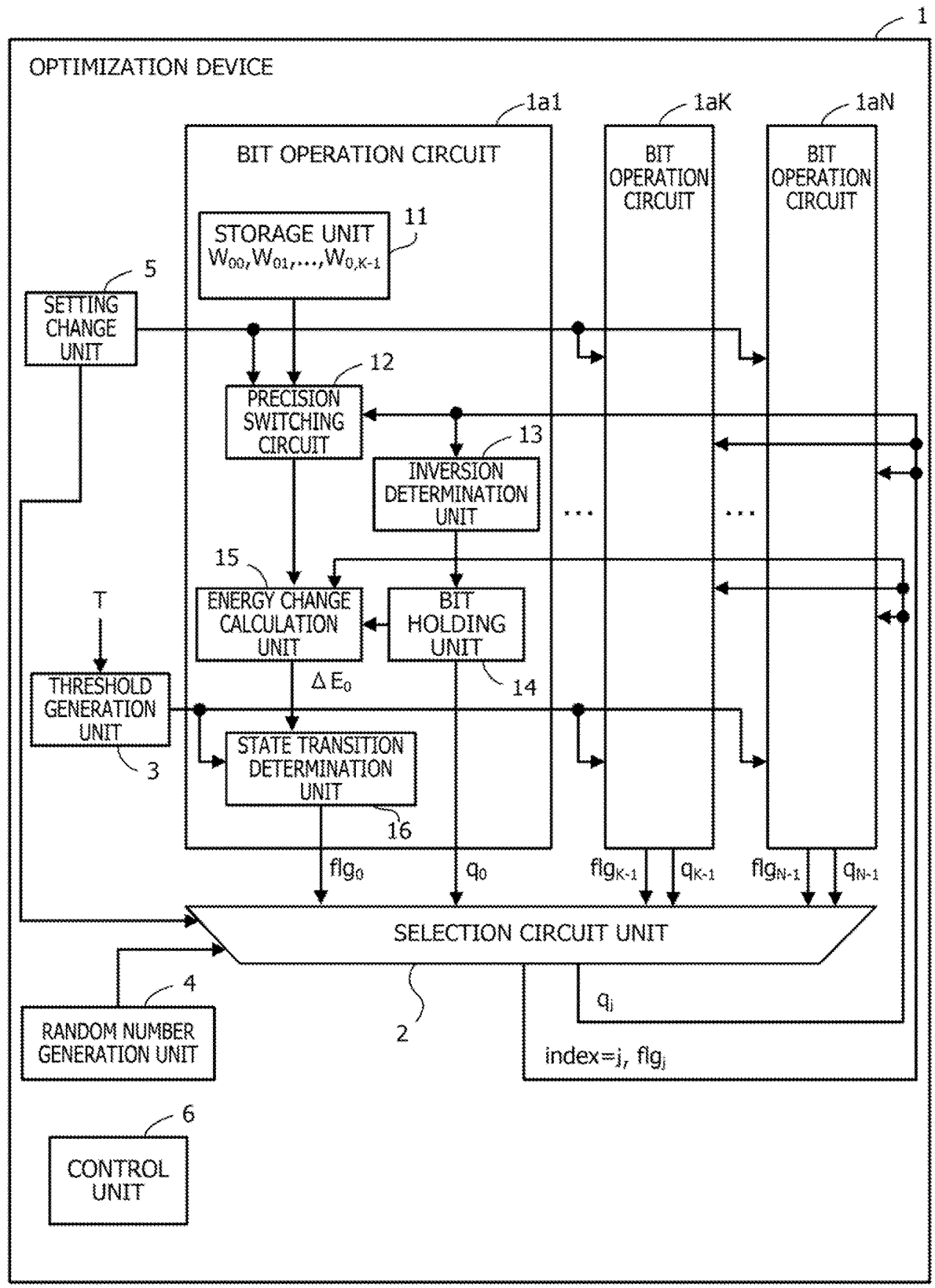
FIG. 1 is a diagram illustrating an optimization device according to a first embodiment.

FIG. 1 is a diagram illustrating an optimization device according to the first embodiment.

An optimization device 1 searches for values (ground state) of bits of when an energy function becomes minimum, of combinations (states) of each value of a plurality of bits (spin bits) corresponding to a plurality of spins included in an Ising model converted from a problem to be calculated.

Here, an Ising-type energy function E(x) is defined by, for example, the following expression (1).

[Math. 1]

$$E(x) = -\sum_{<i,j>} W_{ij} x_i x_j - \sum_i b_i x_i \quad (1)$$

The first term on the right side is an integration of products of values (0 or 1) of two bits and a coupling coefficient, for all of combinations of two bits selectable from all of bits included in the Ising model without omission and duplication. The total number of bits included in the Ising model is K (K is an integer of 2 or larger). Furthermore, each of i and j is an integer of 0 or larger and K−1 or smaller. $x_i$ is a variable (also referred to as a state variable) representing the value of the i-th bit. $x_j$ is a variable representing the value of the j-th bit. $W_{ij}$ is a weight coefficient indicating the magnitude of an interaction between the i-th and j-th bits. Note that $W_{ii}=0$. Furthermore, in many cases, $W_{ij}=W_{ji}$ (in other words, for example, a coefficient matrix based on the weight coefficients is often a symmetric matrix).

The second term on the right side is a sum of products of each bias coefficients of all the bits and values of the bits. $b_i$ represents the bias coefficient of the i-th bit.

Furthermore, when the value of the variable $x_i$ changes to $1-x_i$, the increment of the variable x can be expressed as $\Delta x_i = (1-x_i) - x_i = 1-2x_i$. Thus, an energy change $\Delta E_i$ accompanying spin inversion (a change in value) is expressed by the expression (2) below.

[Math. 2]

$$\begin{aligned}\Delta E_i &= E(x)|_{x_i \to 1-x_i} - E(x) \\ &= -\Delta x_i \left( \sum_j W_{ij} x_j + b_i \right) \\ &= -\Delta x_i h_i \\ &= \begin{cases} -h_i & (\text{for } x_i = 0 \to 1) \\ +h_i & (\text{for } x_i = 1 \to 0) \end{cases}\end{aligned} \quad (2)$$

$h_i$ is called local field and is expressed by the expression (3).

[Math. 3]

$$h_i = \sum_j W_{ij} x_j + b_i \quad (3)$$

The local field h multiplied by a sign (+1 or −1) depending on $\Delta x_i$ is the energy change $\Delta E_i$. The change $\Delta h_i$ of the local field $h_i$ is expressed by the expression (4).

[Math. 4]

$$\Delta h_i = \begin{cases} +W_{ij} & (\text{for } x_j = 0 \to 1) \\ -W_{ij} & (\text{for } x_j = 1 \to 0) \end{cases} \quad (4)$$

Processing of updating the local field $h_i$ when a certain variable $x_j$ changes is performed in parallel.

The optimization device 1 is, for example, a one-chip semiconductor integrated circuit and is implemented using a field programmable gate array (FPGA) and the like. The optimization device 1 includes a bit operation circuit 1a1, . . . , 1aK, . . . , and 1aN (a plurality of bit operation circuits), a selection circuit unit 2, a threshold generation unit 3, a random number generation unit 4, a setting change unit 5, and a control unit 6. Here, N is a total number of the bit operation circuits included in the optimization device 1. N is an integer of K or larger. Identification information (index=0, . . . , K−1 . . . , N−1) is associated with each of the bit operation circuits 1a1, . . . , 1aK, . . . , and 1aN.

The bit operation circuit 1a1, . . . , 1aK, . . . , or 1aN is a unit element that provides one bit included in a bit string representing a state of the Ising model. The bit string may be called spin bit string, state vector, or the like. Each of the bit operation circuits 1a1, . . . , 1aK, . . . , and 1aN stores the weight coefficient between its own bit and another bit, determines inversion availability of the own bit according to inversion of the another bit on the basis of the weight coefficient, and outputs a signal indicating the inversion availability of the own bit to the selection circuit unit 2.

The selection circuit unit 2 selects a bit to be inverted (inversion bit) from the spin bit string. Specifically, the selection circuit unit 2 receives the signal of inversion availability output from each of the bit operation circuits 1a1, . . . , and 1aK used for searching for the ground state of the Ising model, of the bit operation circuits 1a1, . . . , 1aK, . . . , and 1aN. The selection circuit unit 2 preferentially selects one bit corresponding to the bit operation circuit that has outputted an inversion available signal from among the bit operation circuits 1a1, . . . , and 1aK, and adopts the selected bit as the inversion bit. For example, the selection circuit unit 2 selects the inversion bit on the basis of a random number bit output by the random number generation unit 4. The selection circuit unit 2 outputs a signal indicating the selected inversion bit to the bit operation circuits 1a1, . . . , and 1aK. The signal indicating the inversion bit includes a signal indicating identification information of the inversion bit (index=j), a flag indicating inversion availability ($flg_j$=1), and a current value $q_j$ of the inversion bit (a value before the inversion this time). Note that none of the bits may be inverted. In the case where neither bit is inverted, the selection circuit unit 2 outputs $flg_j$=0.

The threshold generation unit 3 generates a threshold to be used for determining the inversion availability of a bit for each of the bit operation circuits 1a1, . . . , 1aK, . . . , and 1aN. A signal indicating the threshold is output to each of the bit operation circuits 1a1, . . . , 1aK, . . . , and 1aN. As will be described below, the threshold generation unit 3 uses a parameter (temperature parameter) T indicating temperature and a random number to generate the threshold. The threshold generation unit 3 includes a random number generation unit that generates the random number. Favorably, the threshold generation unit 3 individually includes the random number generation unit and individually generates and supplies the threshold for each of the bit operation circuits 1a1, . . . , 1aK, . . . , and 1aN. Note that the threshold generation unit 3 may share the random number generation unit among a predetermined number of bit operation circuits.

The random number generation unit 4 generates and outputs the random number bit to the selection circuit unit 2. The random number bit generated by the random number generation unit 4 is used for selecting the inversion bit by the selection circuit unit 2.

The setting change unit 5 changes the first number of bits (the number of spin bits) of the bit string (spin bit string) representing the state of the Ising model to be calculated, of the bit operation circuits 1a1, . . . , 1aK, . . . , and 1aN. Furthermore, the setting change unit 5 changes the second number of bits of the weight coefficients for each of the bit operation circuits of the first number of bits.

The control unit 6 sets the temperature parameter T and the weight coefficient for each storage unit of the bit operation circuits 1a1, . . . , and 1aN, and controls the start and termination of operations by the bit operation circuits 1a1, . . . , and 1aN. The control unit 6 outputs an operation result. For example, when the operations using the bit operation circuits 1a1, . . . , and 1aK end, the control unit 6 reads and outputs the spin bit strings held in the bit operation circuits 1a1, . . . , and 1aK.

Next, a circuit configuration of the bit operation circuit will be described. The bit operation circuit 1a1 (index=0) will be mainly described, but other bit operation circuits can be implemented with a similar circuit configuration (for example, the index=X−1 is set for the X-th (X is an integer of 1 or more and N or less) bit operation circuit)).

The bit operation circuit 1a1 includes a storage unit 11, a precision switching circuit 12, an inversion determination unit 13, a bit holding unit 14, an energy change calculation unit 15, and a state transition determination unit 16.

The storage unit 11 is, for example, a register, a static random access memory (SRAM), or the like. The storage unit 11 stores a coefficient indicating the magnitude of an interaction between bits in the spin bit string. More specifically, the storage unit 11 stores the weight coefficient between its own bit (here, the bit with the index=0) and another bit. Here, the total number of weight coefficients is $K^2$ for the number of spin bits (the first number of bits) K. The storage unit 11 stores K weight coefficients $W_{00}$, $W_{01}$, . . . , and $W_{0,K-1}$ for the bit of index=0. Here, the weight coefficients are represented by the second number of bits L. Therefore, the storage unit 11 requires K×L bits to store the weight coefficients. Note that the storage unit 11 may be provided outside the bit operation circuit 1a1 and inside the optimization device 1 (the same similarly applies to the storage units of the other bit operation circuits).

When any bit in the spin bit string is inverted, the precision switching circuit 12 reads the weight coefficient for the inverted bit from the storage unit 11 of its own (bit operation circuit 1a1), and outputs the read weight coefficient to the energy change calculation unit 15. That is, the precision switching circuit 12 receives the identification information of the inversion bit from the selection circuit unit 2, reads the weight coefficient corresponding to a set of the inversion bit and its own bit from the storage unit 11, and outputs the weight coefficient to the energy change calculation unit 15.

At this time, the precision switching circuit 12 reads the weight coefficients represented by the second number of bits set by the setting change unit 5. The precision switching circuit 12 changes the second number of bits of the coefficients read from the storage unit 11 according to the change in the second number of bits by the setting change unit 5.

For example, the precision switching circuit 12 incudes a selector that reads a bit string of a predetermined number of bits from the storage unit 11. In a case where the predetermined number of bits read by the selector is larger than the second number of bits, the precision switching circuit 12 reads a unit bit string including the weight coefficient corresponding to the inversion bit using the selector, and extracts weight coefficients represented by the second number of bits from the read unit bit string. Alternatively, in the case where the predetermined number of bits read by the selector is smaller than the second number of bits, the precision switching circuit 12 may extract the weight coefficients represented by the second number of bits from the storage unit 11 by coupling a plurality of bit strings read by the selector.

The inversion determination unit 13 receives the signal indicating the index=j and $flg_j$ output by the selection circuit unit 2, and determines whether the own bit has been selected as the inversion bit on the basis of the signal. In the case where the own bit has been selected as the inversion bit (that is, the index=j indicates the own bit and fig indicates inversion available), the inversion determination unit 13 inverts the bit stored in the bit holding unit 14. That is, in a case where the bit held in the bit holding unit 14 is 0, the bit is changed to 1. Meanwhile, in a case where the bit held in the bit holding unit 14 is 1, the bit is changed to 0.

The bit holding unit 14 is a register that holds one bit. The bit holding unit 14 outputs the held bit to the energy change calculation unit 15 and the selection circuit unit 2.

The energy change calculation unit 15 calculates an energy change value $\Delta E_0$ of the Ising model using the weight coefficient read from the storage unit 11 and outputs the energy change value $\Delta E_0$ to the state transition determination unit 16. Specifically, the energy change calculation unit 15 receives the value of the inversion bit (the value before the inversion this time) from the selection circuit unit 2, and calculates $\Delta h_0$ by the expression (4) according to whether the inversion bit is inverted from 1 to 0 or 0 to 1. Then, the energy change calculation unit 15 updates $h_0$ by adding $\Delta h_0$ to the previous $h_0$. The energy change calculation unit 15 includes a register that holds $h_0$ and holds the updated $h_0$ by the register.

Moreover, the energy change calculation unit 15 receives the current own bit from the bit holding unit 14, and calculates the energy change value $\Delta E_0$ of the Ising model of the case where the own bit is inverted from 0 to 1 when the own bit is 0, or from 1 to 0 when the own bit is 1, by the expression (2) The energy change calculation unit 15 outputs the calculated energy change value $\Delta E_0$ to the state transition determination unit 16.

The state transition determination unit 16 outputs a signal fIg$_0$ indicating the inversion availability of the own bit according to the energy change calculation by the energy change calculation unit 15 to the selection circuit unit 2. Specifically, the state transition determination unit 16 is a comparator that receives the energy change value $\Delta E_0$ calculated by the energy change calculation unit 15, and determines the inversion availability of the own bit according to comparison of the energy change value $\Delta E_0$ with the threshold generated by the threshold generation unit 3. Here, the determination by the state transition determination unit 16 will be described.

In simulated annealing, it is known that, when an allowance probability $p(\Delta E, T)$ of a state transition that causes a certain energy change $\Delta E$ is determined as the expression (5) below, the state reaches an optimal solution (ground state) in the limit of the time (the number of iterations) infinity.

[Math. 5]

$$p(\Delta E, T) = f\left(-\frac{\Delta E}{T}\right) \quad (5)$$

In the expression (5), T is the temperature parameter T described above. Here, as a function f, the expression (6) (Metropolis method) or the expression 7 Gibbs method is used.

[Math. 6]

$$f_{metro}(x) = \min(1, e^x) \quad (6)$$

[Math. 7]

$$f_{Gibbs}(x) = \frac{1}{1+e^{-x}} \quad (7)$$

The temperature parameter T is expressed by, for example, the expression (8). That is, the temperature parameter T is given by a function that logarithmically decreases with respect to the number of iterations t. For example, a constant c is determined according to the problem.

[Math. 8]

$$T = \frac{T_0 \log(c)}{\log(t+c)} \quad (8)$$

Here, $T_0$ is an initial temperature value, and is desirably a sufficiently large value depending on the problem.

In the case of using the allowance probability $p(\Delta E, T)$ expressed by the expression (5), when a state reaches a steady state after sufficient repetition of the state transition at a certain temperature, the state is generated according to the Boltzmann distribution. That is, an occupancy probability of each state follows the Boltzmann distribution for a thermal equilibrium state in thermodynamics. Therefore, by gradually decreasing the temperature in such a manner that the state following the Boltzmann distribution is generated at a certain temperature, and the state follow the Boltzmann distribution is generated at a temperature lower than the certain temperature, the state following the Boltzmann distribution at each temperature can be achieved. Then, when the temperature is 0, the lowest energy state (ground state) is achieved with a high probability by the Boltzmann distribution at the temperature 0. Since this state is very similar to a state change of when a material is annealed, this method is called simulated annealing. At this time, probabilistic occurrence of a state transition that increases energy corresponds to thermal excitation in physics.

For example, a circuit that outputs a flag (fIg=1) indicating allowance of the state transition that causes the energy change $\Delta E$ with the allowance probability $p(\Delta E, T)$ can be implemented by a comparator that outputs a value according to a comparison between $f(-\Delta E/T)$ and a uniform random number u taking a value in an interval [0, 1).

However, the same function can be implemented even when the following modification is made. Applying the same monotonically increasing function to two numbers does not change the magnitude relationship. Therefore, even when the same monotonically increasing function is applied to two inputs of the comparator, the output of the comparator does not change. For example, an inverse function $f^{-1}(-\Delta E/T)$ of $f(-\Delta E/T)$ can be used as the monotonically increasing function applied to $f(-\Delta E/T)$, and $f'(u)$ in which $-\Delta E/T$ of $f^{-1}(-\Delta E/T)$ is u can be used as the monotonically increasing function applied to the uniform random number u. In that case, a circuit having a similar function to the above-described comparator may be a circuit that outputs 1 when $-\Delta E/T$ is larger than $f^{-1}(u)$. Moreover, since the temperature parameter T is positive, the state transition determination unit 16 may be a circuit that outputs fIg$_0$=1 when $-\Delta E$ is larger than $T \cdot f^{-1}(u)$ (or when $\Delta E$ is smaller than $-(T \cdot f^{-1}(u))$).

The threshold generation unit 3 generates the uniform random number u and outputs the value of $f^{-1}(u)$, using a conversion table for conversion to the value of $f^{-1}(u)$ described above. When the Metropolis method is applied, $f^{-1}(u)$ is given by the expression (9). Furthermore, when the Gibbs method is applied, $f^{-1}(u)$ is given by the expression (10).

[Math. 9]

$$f_{metro}^{-1}(u) = \log(u) \quad (9)$$

[Math. 10]

$$f_{Gibbs}^{-1}(u) = \log\left(\frac{u}{1-u}\right) \quad (10)$$

The conversion table is stored in, for example, a memory such as a random access memory (RAM) or a flash memory (not illustrated) connected to the threshold generation unit 3. The threshold generation unit 3 outputs a product $(T \cdot f^{-1}(u))$ of the temperature parameter T and $f^{-1}(u)$ as the threshold. Here, $T \cdot f^{-1}(u)$ corresponds to thermal excitation energy.

Note that, when the selection circuit unit 2 inputs fIg$_j$ to the state transition determination unit 16 to indicate that fIg$_j$ does not allow the state transition (that is, the state transition does not occur), the state transition determination unit 16 may perform comparison with the threshold after adding an offset value to $-\Delta E_0$. Furthermore, the state transition determination unit 16 may increase the offset value to be added in a case where non-occurrence of the state transition continues. Meanwhile, in a case where fIg$_1$ allows the state transition (that is, the state transition occurs), the state transition determination unit 16 sets the offset value to 0.

The addition of the offset value to $-\Delta E_0$ or the increase in the offset value enables the state transition to be more easily allowed. In the case where the current state is in a local solution, escape from the local solution is promoted.

In this way, the temperature parameter T is set to be gradually small, and the spin bit string in the case where, for example, the value of the temperature parameter T is set to be small by a predetermined number of times (or the temperature parameter T has reached the minimum value) is held in the bit operation circuit 1a1, . . . , and 1aK. The optimization device 1 outputs the spin bit string of the case where the value of the temperature parameter T is set to be small by a predetermined number of times (or the temperature parameter T has reached the minimum value) as the solution.

In the optimization device 1, the above setting change unit 5 can change the number of spin bits (first number of bits) of the Ising model and the number of bits (second number of bits) of the weight coefficients between bits. Here, the number of spin bits corresponds to the scale of the circuit that implements the Ising model (the scale of the problem). The optimization device 1 can be applied to the combinatorial optimization problem having a larger number of combination candidates as the scale is larger. Furthermore, the number of bits of the weight coefficients corresponds to the precision of expression of the interrelationship between bits (precision of conditional expression in the problem). The conditions for the energy change $\Delta E$ at the time of spin inversion can be set in more details as the precision is higher. There are some cases where, in a problem, the number of spin bits is large and the number of bits representing the weight coefficients is small. Alternatively, in another problem, the number of spin bits is small and the number of bits representing the weight coefficients is large. Meanwhile, it is inefficient to individually manufacture the optimization device suitable for each problem according to the problem.

Therefore, the optimization device 1 enables the setting change unit 5 to set the number of spin bits representing the state of the Ising model and the number of bits of the weight coefficients, thereby making the scale and precision variable. As a result, the scale and precision that suits the problem can be implemented in one optimization device 1.

More specifically, each of the bit operation circuits 1a1, . . . , 1aK, . . . , and 1aN includes the precision switching circuit, and switches, using the precision switching circuit, a bit length of the weight coefficient read from its own storage unit according to the setting by the setting change unit 5. Furthermore, the selection circuit unit 2 inputs the signal indicating the inversion bit to the number (for example, K) bit operation circuits corresponding to the number of spin bits set by the setting change unit 5, and selects the inversion bit from among the bits corresponding to the number (K) of bit operation circuits. Thereby, the Ising model can be implemented by one optimization device 1 with the scale and precision according to the problem even if the optimization device having the scale and precision according to the problem is not individually manufactured.

Here, as described above, the storage unit included in each of the bit operation circuits 1a1, . . . , and 1aN is implemented by a storage device having a relatively small capacity such as an SRAM. Therefore, the capacity of the storage unit may become insufficient depending on the number of bits of the weight coefficients when the number of spin bits increases. Meanwhile, according to the optimization device 1, the scale and precision can be set to satisfy the limitation of the capacity of the storage unit by the setting change unit 5. Specifically, it is conceivable that the setting change unit 5 decreases the number of bits of the weight coefficients as the number of spin bits increases. Furthermore, it is also conceivable that the setting change unit 5 decreases the number of spin bits as the number of bits of the weight coefficients increases.

Furthermore, in the above example, K bit operation circuits of the N bit operation circuits are used for the Ising model. The optimization device 1 may not use the remaining N−K bit operation circuits. In that case, the selection circuit unit 2 forcibly sets all the flags flg output by the remaining N−K bit operation circuits to 0 so that the bits corresponding to the remaining N−K bit operation circuits are not selected as candidates for inversion.

Alternatively, in a case where N−K≥K, the optimization device 1 may implement the same Ising model as the above-described Ising model, using the K bit operation circuits of the remaining N−K bit operation circuits, and increase the degree of parallelism of the same problem processing by both the Ising models to speed up the calculation.

Moreover, the optimization device 1 may implement another Ising model corresponding to another problem, using some of the remaining N−K bit operation circuits, and perform operation of the another problem in parallel with the problem represented by the above-described Ising model.

Hereinafter, an information processing system using the optimization device 1 will be illustrated, and the functions of the optimization device 1 will be described in more detail.

Second Embodiment

Next, a second embodiment will be described.

Figure 2:
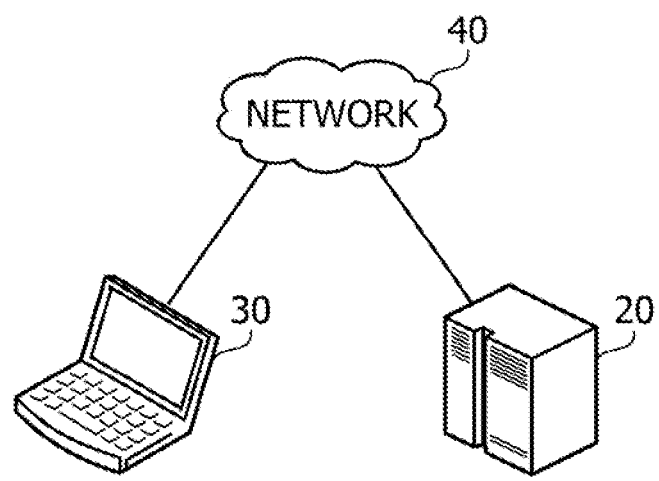
FIG. 2 is a diagram illustrating an example of an information processing system according to a second embodiment.

FIG. 2 is a diagram illustrating an example of an information processing system according to the second embodiment.

The information processing system of the second embodiment includes an information processing device 20 and a client 30. The information processing device 20 and the client 30 are connected to a network 40. The network 40 may be, for example, a local area network (LAN), a wide area network (WAN), the Internet, or the like.

The information processing device 20 provides a function to replace a combinatorial optimization problem with an Ising model and solve the combinatorial optimization problem at high speed by searching for a ground state of the Ising model.

The client 30 is a client computer used by a user, and is used for inputting a problem to be solved by the user to the information processing device 20.

Figure 3:
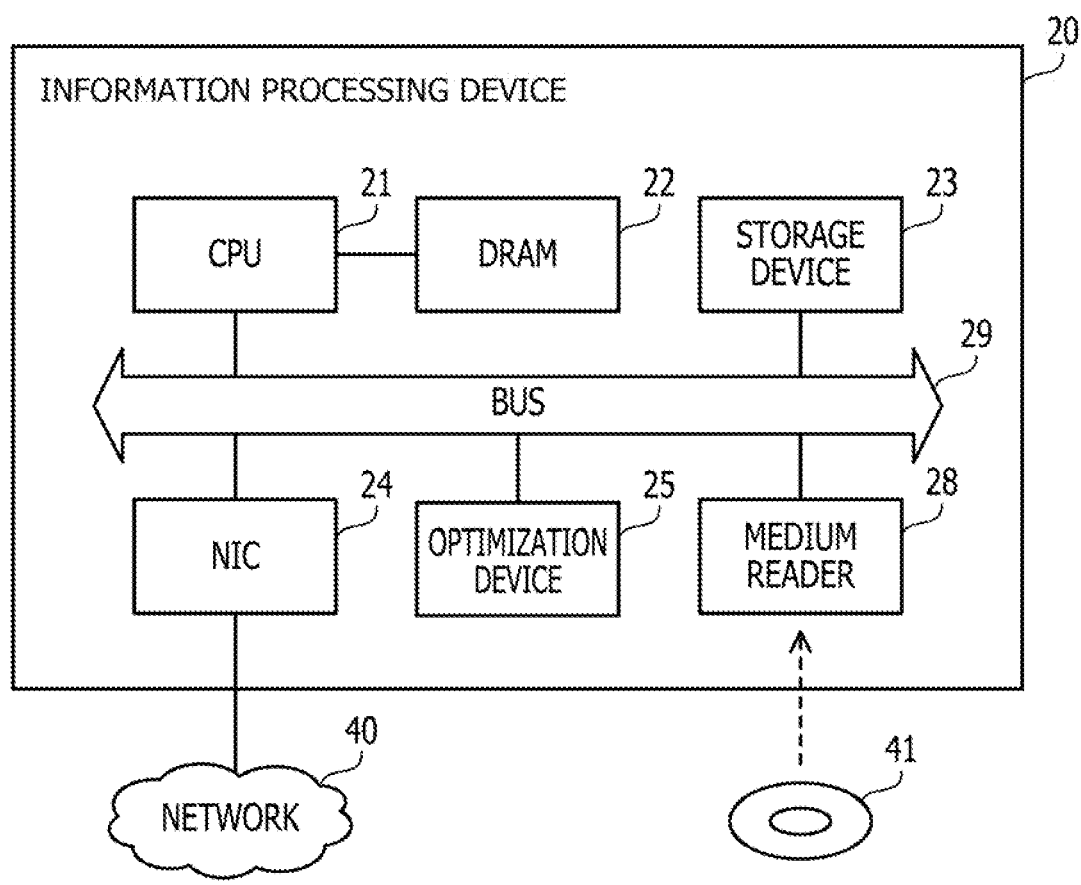
FIG. 3 is a block diagram illustrating a hardware example of an information processing device.

FIG. 3 is a block diagram illustrating a hardware example of the information processing device.

The information processing device 20 includes a central processing unit (CPU) 21, a dynamic random access memory (DRAM) 22, a storage device 23, a network interface card (NIC) 24, an optimization device 25, and a medium reader 28.

The CPU 21, DRAM 22, storage device 23, NIC 24, optimization device 25, and medium reader 28 are connected to a bus 29 of the information processing device 20. The bus 29 is, for example, a peripheral component interconnect express (PCIe) bus.

The CPU 21 is a processor that executes instructions of a program stored in the DRAM 22. The CPU 21 loads the program and at least a part of data stored in the storage device 23 to the DRAM 22, and executes the program. The CPU 21 controls settings and operations of the optimization device 25 by a function exhibited by executing the program.

The DRAM 22 is a main storage device of the information processing device 20, and temporarily stores the program executed by the CPU 21 and data or the like set in the optimization device 25.

The storage device 23 is an auxiliary storage device of the information processing device 20, and stores the program executed by the CPU 21 and data or the like set in the optimization device 25. The storage device 23 is, for example, a solid state drive (SSD), a hard disk drive (HDD), or the like.

The NIC 24 is a communication interface that is connected to the network 40 and communicates with the client 30 via the network 40. The NIC 24 is connected to, for example, communication devices such as a switch and a router belonging to the network 40 via a cable.

The optimization device 25 searches for the ground state of the Ising model under the control of the CPU 21. The optimization device 25 is, for example, a one-chip semiconductor integrated circuit, and is implemented by an FPGA or the like. The optimization device 25 is an example of the optimization device 1 according to the first embodiment.

The medium reader 28 is a reading device that reads a program or data recorded in a recording medium 41. As the recording medium 41, for example, a magnetic disk, an optical disk, a magneto-optical (MO) disk, a semiconductor memory, or the like may be used. The magnetic disk includes a flexible disk (FD) and an HDD. The optical disc includes a compact disc (CD) and a digital versatile disc (DVD).

The medium reader 28 copies the program and data read from the recording medium 41 to another recording medium such as the DRAM 22 or the storage device 23, for example. The read program is executed by the CPU 21, for example. Note that the recording medium 41 may be a portable recording medium, and may be used for distribution of the program and data.

Furthermore, the recording medium 41 and the storage device 23 may be sometimes referred to as computer-readable recording media.

Note that the client 30 includes a CPU, a main storage device, an auxiliary storage device, a NIC, an input device such as a mouse and a keyboard, and a display.

Figure 4:
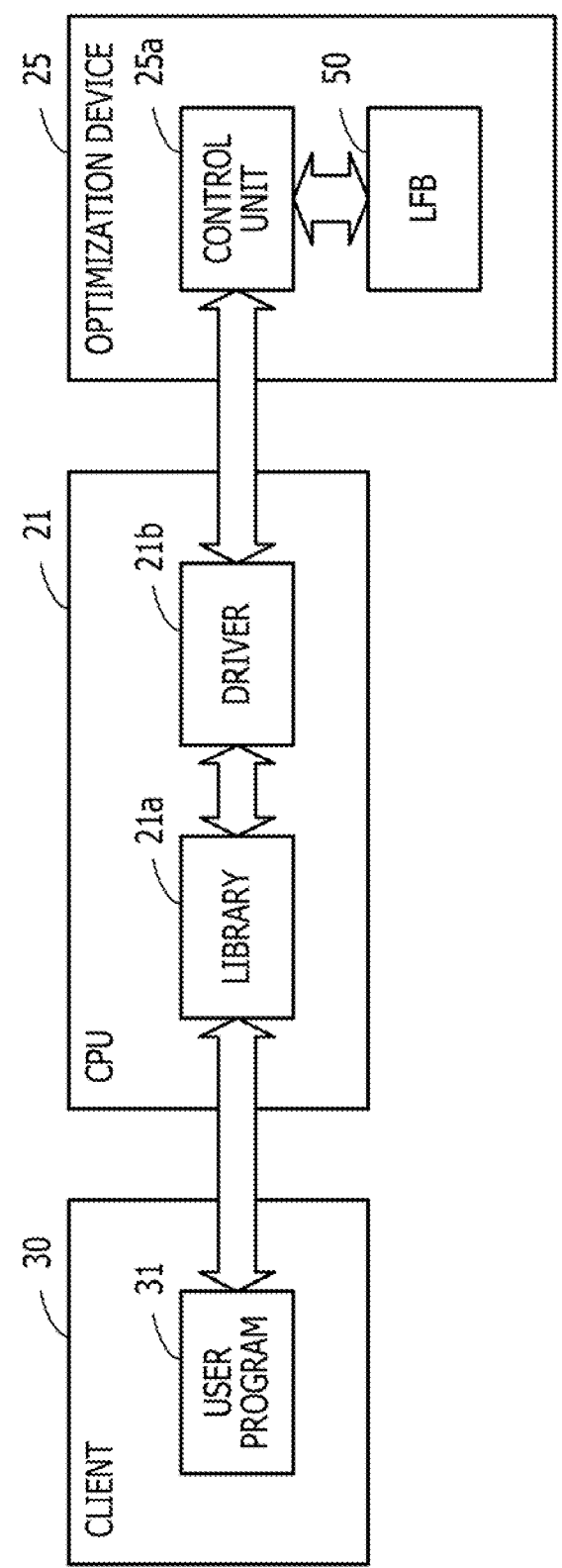
FIG. 4 is a diagram illustrating an example of a relationship of hardware in the information processing system.

FIG. 4 is a diagram illustrating an example of a relationship of hardware in the information processing system.

The client 30 executes a user program 31. The user program 31 inputs various data (for example, operating conditions such as content of a problem to be solved and a use schedule of the optimization device 25) to the information processing device 20, and displays an operation result by the optimization device 25. The client 30 and the NIC 24 implement an input unit that inputs various data to the information processing device 20 and a display unit that notifies a solution obtained as a result of a ground state search as it is or displays result information easy to understand by the user (for example, information of a display screen on which the result is visualized as a graph).

The CPU 21 is a processor (operation unit) that executes a library 21a and a driver 21b. A program of the library 21a and a program of the driver 21b are stored in the storage device 23 and are loaded into the DRAM 22 when executed by the CPU 21.

The library 21a receives various data input by the user program 31 and converts the problem to be solved by the user into a problem for searching for the lowest energy state of the Ising model. The library 21a provides the driver 21b with information regarding the converted problem (for example, the number of spin bits, the number of bits representing weight coefficients, values of the weight coefficients, an initial value of a temperature parameter, and the like). Furthermore, the library 21a acquires the search result of the solution by the optimization device 25 from the driver 21b, converts the search result into the result information easy to understand by the user, and provides the search result to the user program 31.

The driver 21b supplies the information provided by the library 21a to the optimization device 25. Furthermore, the driver 21b acquires the search result of the solution by the Ising model from the optimization device 25 and provides the search result to the library 21a.

The optimization device 25 includes a control unit 25a and a local field block (LFB) 50 as hardware.

The control unit 25a includes a RAM for storing an operating condition of the LFB 50 received from the driver 21b, and controls the operation by the LFB 50 on the basis of the operating condition. Furthermore, the control unit 25a sets initial values in various registers provided in the LFB 50, stores the weight coefficients in the SRAM, and reads a spin bit string (search result) after the operation is completed, for example. The control unit 25a is implemented by, for example, a circuit or the like in an FPGA.

The LFB 50 includes a plurality of local field elements (LFEs). The LFE is a unit element corresponding to a spin bit. One LFE corresponds to one spin bit. As will be described below, the optimization device 25 may include a plurality of LFBs.

Figure 5:
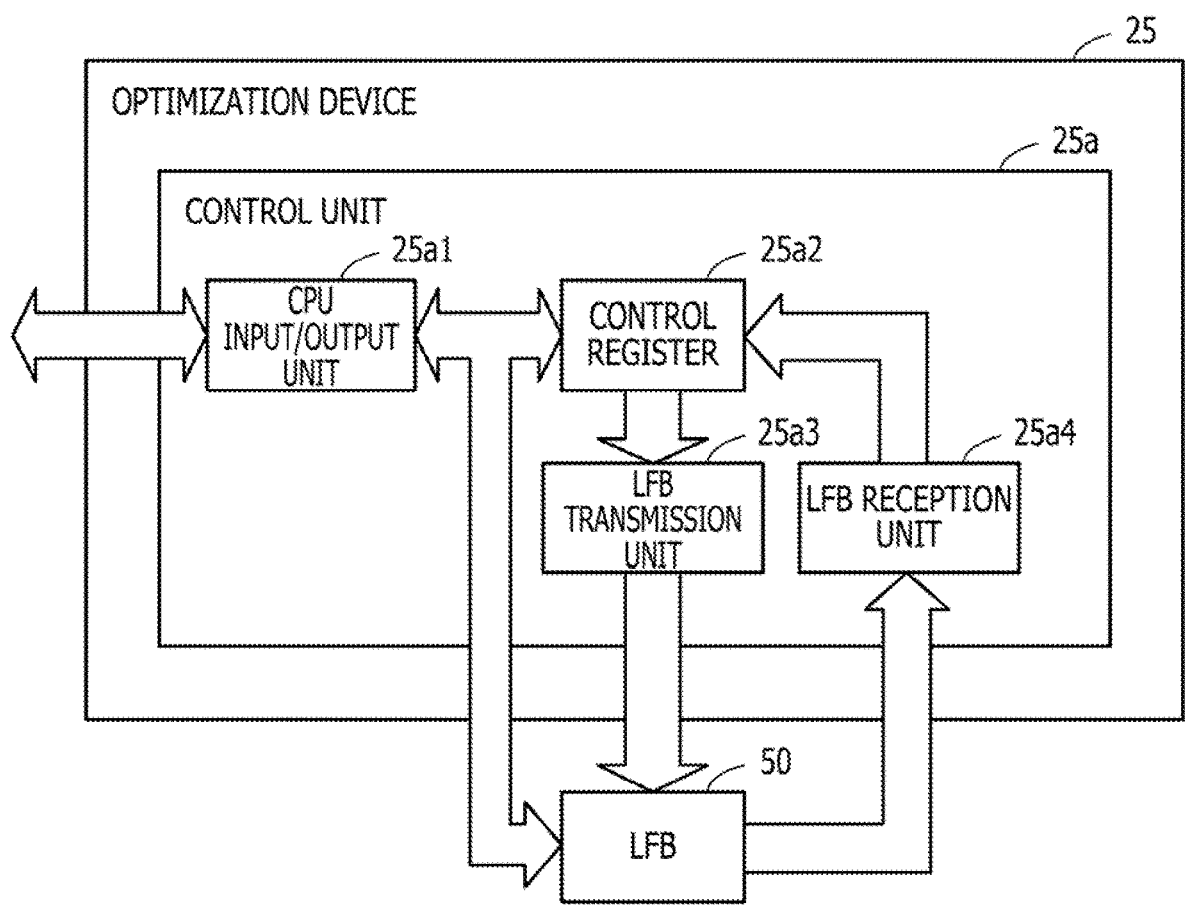
FIG. 5 is a block diagram illustrating a hardware example of a control unit.

FIG. 5 is a block diagram illustrating a hardware example of the control unit.

The control unit 25a includes a CPU input/output unit 25a1, a control register 25a2, an LFB transmission unit 25a3, and an LFB reception unit 25a4.

The CPU input/output unit 25a1 inputs the data received from the CPU 21 to the control register 25a2 or the LFB 50. For example, the CPU input/output unit 25a1 can input setting data such as scale and precision, initial values of parameters, and a coupling constant input by the CPU 21, and the operating condition data of the LFB 50 to the LFB 50 via the control register 25a2, and can input such data to each register or RAM in the LFB 50.

The control register 25a2 holds the various setting data for the LFB 50 by the CPU input/output unit 25a1 and outputs the setting data to the LFB transmission unit 25a3. Furthermore, the control register 25a2 holds the data received from the LFB 50 by the LFB reception unit 25a4 and outputs the data to the CPU input/output unit 25a1.

The LFB transmission unit 25a3 transmits the setting data held in the control register 25a2 to the LFB 50.

The LFB reception unit 25a4 receives the data (such as the operation result) from the LFB 50 and stores the data in the control register 25a2.

Figure 6:
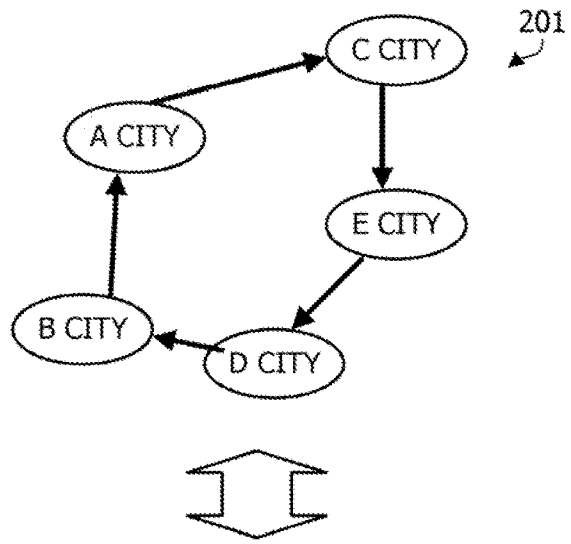
FIG. 6 is a diagram illustrating an example of a combinatorial optimization problem.
Figure 6:
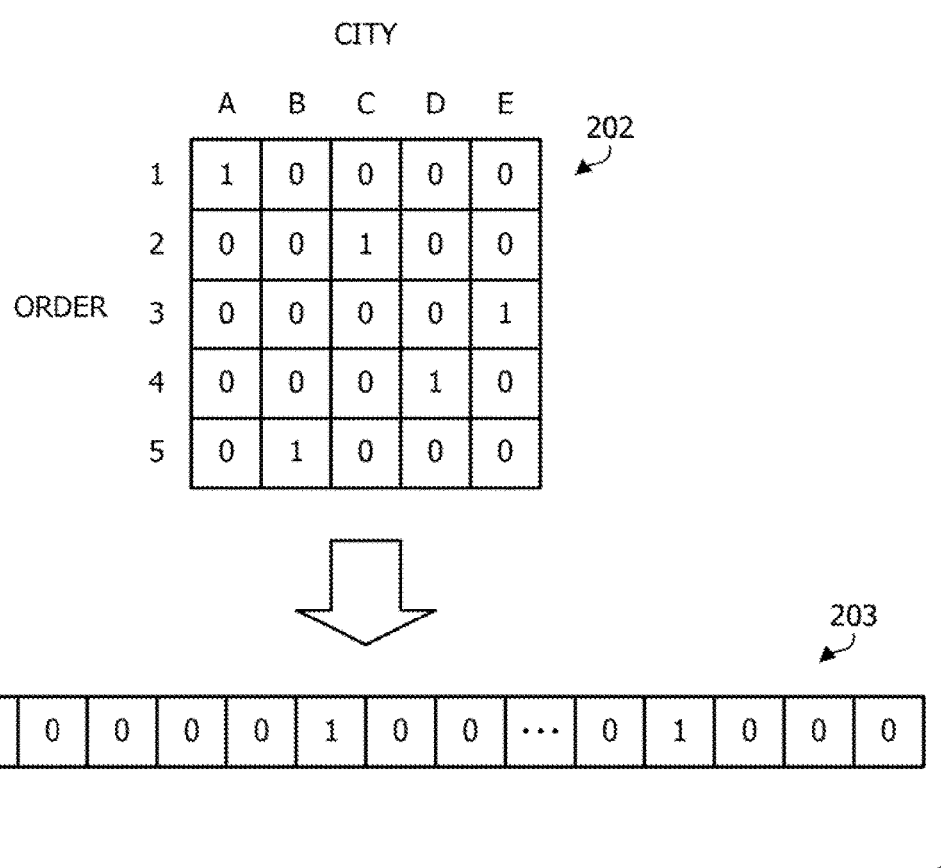

FIG. 6 is a diagram illustrating an example of the combinatorial optimization problem.

As an example of the combinatorial optimization problem, consider a traveling salesman problem. Here, for the sake of simplicity, it is assumed to find a route to go around five cities of A city, B city, C city, D city, and E city at the lowest cost (distance, fee, or the like). Graph 201 illustrates one route having the cities as nodes and movements between the cities as edges. This route is expressed by, for example, a matrix 202 in which rows correspond to the order to go around, and columns corresponds to the cities. The matrix 202 indicates that a salesman moves to the city to which the bit "1" is set in ascending order of rows. Moreover, the matrix 202 can be converted to a binary value 203 corresponding to a spin bit string. In the example of the matrix 202, the binary value 203 is 5×5=25 bits. The number of bits of the binary value 203 (spin bit string) increases as the number of cities to travel increases. That is, as the scale of the combinatorial optimization problem increases, more spin bits are required, and the number of bits (scale) of the spin bit string increases.

Next, a search example for a binary value that is the minimum energy.

Figure 7:
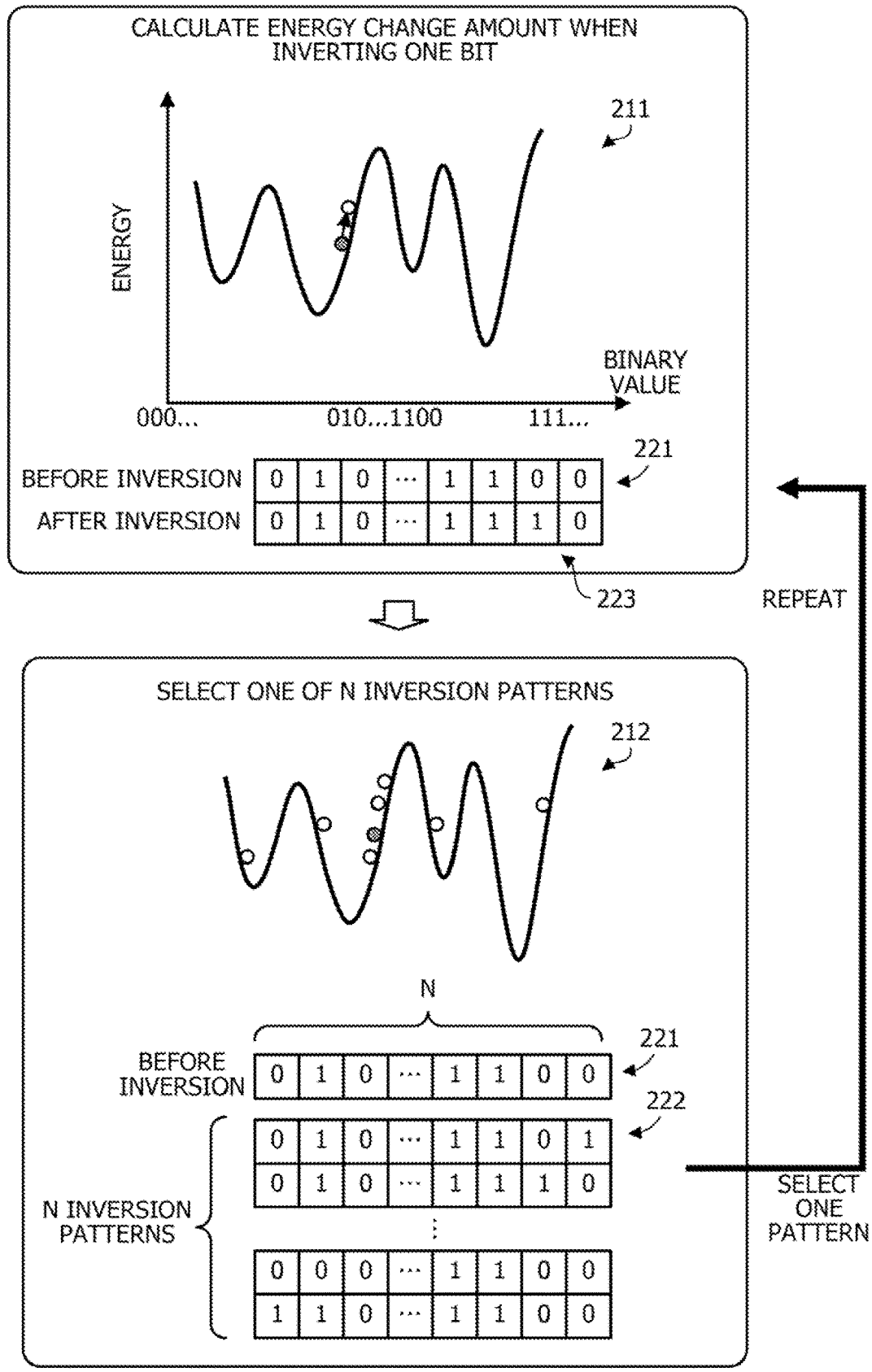
FIG. 7 is a diagram illustrating a search example for a binary value that is minimum energy.

FIG. 7 is a diagram illustrating a search example for a binary value that is minimum energy.

First, the energy before inverting one bit (before spin inversion) of a binary value 221 is $E_{init}$.

The optimization device 25 calculates an energy change amount ΔE when inverting any one bit of the binary value 221. Graph 211 illustrates the energy change with respect to one-bit inversion according to an energy function, where the horizontal axis represents the binary value and the vertical axis represents the energy. The optimization device 25 obtains ΔE by the expression (2).

The optimization device 25 applies the above calculation to all the bits of the binary value 221, and calculates the energy change amount ΔE for the inversion of each of the bits. For example, when the number of bits of the binary value 221 is N, the number of inversion patterns 222 is N. Graph 212 illustrates a state of the energy change for each inversion pattern.

The optimization device 25 randomly selects one of the inversion patterns 222 that satisfy an inversion condition (a predetermined determination condition between a threshold and ΔE) on the basis of ΔE for each inversion pattern. The optimization device 25 adds/subtracts DE corresponding to the selected inversion pattern to/from $E_{init}$ before spin inversion to calculate the energy value E after spin inversion. The optimization device repeats the above procedure using the obtained energy value E as $E_{init}$ and the binary value 223 after spin inversion.

Here, as described above, one element of W used in the expressions (2) and (3) is a spin inversion weight coefficient indicating the magnitude of an interaction between bits. The number of bits representing the weight coefficient is called precision. The conditions for the energy change amount ΔE at the time of spin inversion can be set in more details as the precision is higher. For example, the total size of W is "the precision x the number of spin bits x the number of spin bits" for all of couplings of two bits contained in the spin bit string. As an example, in the case where the number of spin bits is 8 k (=8192), the total size of W is "precision×8 k×8 k" bits.

Next, a circuit configuration of the optimization device 25 that performs the search illustrated in FIG. 7 will be described.

Figure 8:
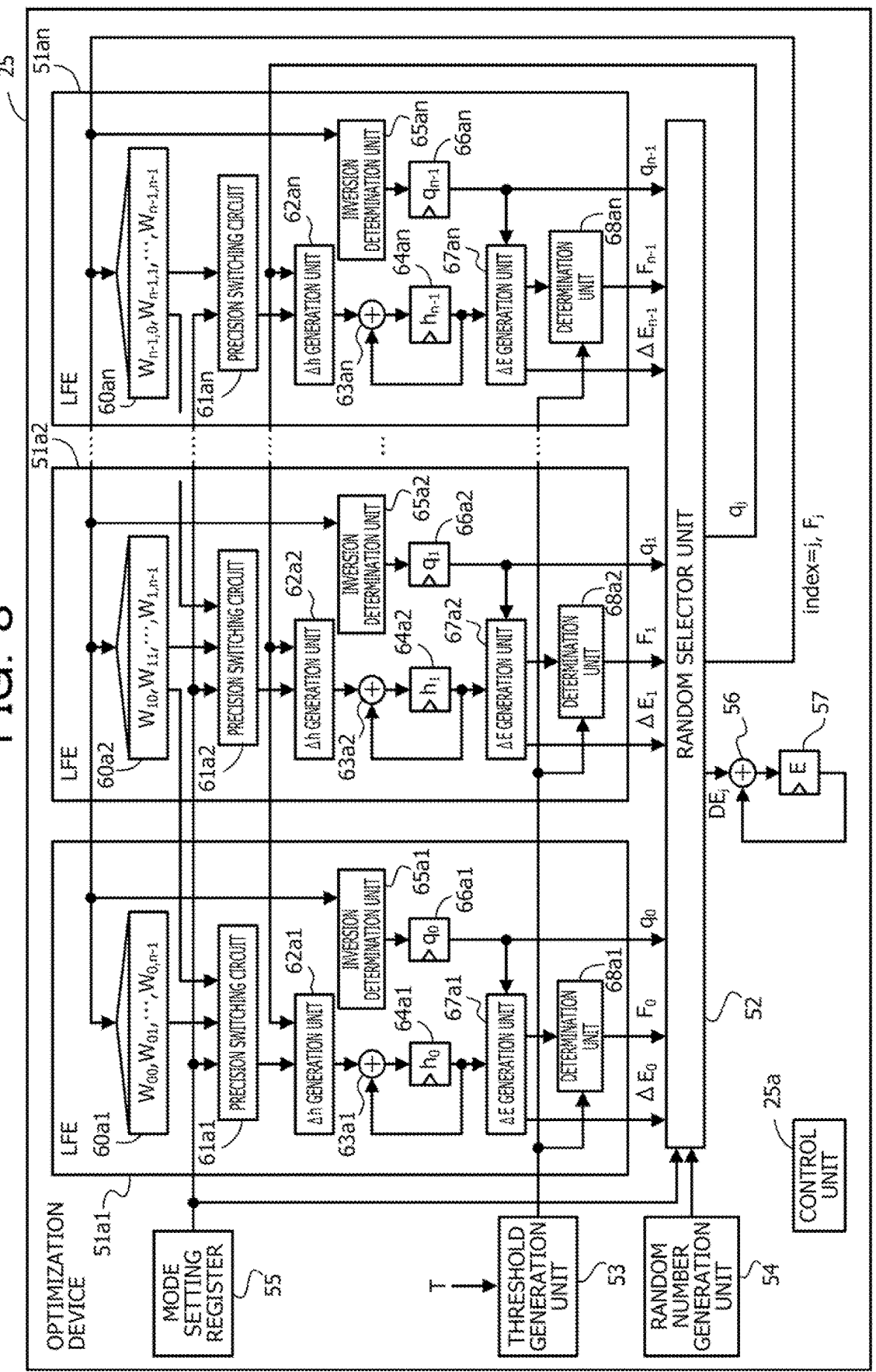
FIG. 8 is a diagram illustrating a circuit configuration example of the optimization device.

FIG. 8 is a diagram illustrating a circuit configuration example of the optimization device.

The optimization device 25 (or the LFB 50 of the optimization device 25) includes LFEs 51a1, 51a2, . . . , and 51an, a random selector unit 52, a threshold generation unit 53, a random number generation unit 54, a mode setting register 55, an adder 56, and an E storage register 57.

Each of the LFEs 51a1, 51a2, . . . , and 51an is used as one bit of the spin bit. n is an integer of 2 or larger and represents the number of LFEs included in the LFB 50. Identification information (index) of the LFE is associated with each of the LFEs 51a1, 51a2, . . . , and 51an. The index=0, 1, . . . , or n–1 for each of the LFEs 51a1, 51a2, . . . , and 51an. The LFEs 51a1, 51a2, . . . , and 51an are examples of the bit operation circuits 1a1, . . . , and 1aN in the first embodiment.

Hereinafter, the circuit configuration of the LFE 51a1 will be described. The LFEs 51a2, . . . , and 51an are also implemented with a circuit configuration similar to the LFE 51a1. Regarding description of the circuit configurations of the LFEs 51a2, . . . , and 51an, the "a1" part at the end of the reference sign of each of the element in the following description is replaced with "a2", . . . , and "an" (for example, the reference sign of "60a1" is replaced with "60an"), respectively. Furthermore, the subscripts of each of the values such as h, q, ΔE, and W may be replaced with subscripts corresponding to "a2", . . . , and "an", respectively.

The LFE 51a1 includes an SRAM 60a1, a precision switching circuit 61a1, a Δh generation unit 62a1, an adder 63a1, an h storage register 64a1, an inversion determination unit 65a1, a bit storage register 66a1, a ΔE generation unit 67a1, and a determination unit 68a1.

The SRAM 60a1 stores the weight coefficients W. The SRAM 60a1 corresponds to the storage unit 11 of the first embodiment. The SRAM 60a1 stores only the weight coefficients W used by the LFE 51a1, of all the weight coefficients W of all the spin bits. Therefore, when the number of spin bits is K (K is an integer of 2 or larger and n or smaller), the size of all the weight coefficients stored in the SRAM 60a1 is "precision×K" bits. FIG. 8 illustrates the case where the number of spin bits K=n as an example. In this case, the weight coefficients $W_{00}$, $W_{01}$, . . . , and $W_{0,n-1}$ are stored in the SRAM 60a1.

The precision switching circuit 61a1 acquires the index that is identification information of an inversion bit and a flag F indicating inversion available from the random selector unit 52, and extracts the weight coefficient corresponding to the inversion bit from the SRAM 60a1. The precision switching circuit 61a1 outputs the extracted weight coefficient to the Δh generation unit 62a1. For example, the precision switching circuit 61a1 may acquire the index and the flag F stored in the SRAM 60a1 by the random selector unit 52 from the SRAM 60a1. Alternatively, the precision switching circuit 61a1 may have a signal line that receives supply of the index and the flag F from the random selector unit 52 (not illustrated).

Here, the precision switching circuit 61a1 receives the setting of the number of bits (precision) of the weight coefficients set in the mode setting register 55, and switches the number of bits of the weight coefficients read from the SRAM 60a1 according to the setting.

Specifically, the precision switching circuit 61a1 includes a selector for reading a bit string (unit bit string) having a predetermined number of unit bits from the SRAM 60a1. The precision switching circuit 61a1 reads the unit bit string of the number of bits r including the weight coefficient corresponding to the inversion bit by the selector. For example, in a case where the number of unit bits r read by the selector is larger than the number of bits z of the weight coefficient, the precision switching circuit 12 reads the weight coefficients by shifting the bit portion indicating the weight coefficient corresponding to the inversion bit toward a least significant bit (LSB) side and substituting 0 for the other bit portions with respect to the read bit string. Alternatively, the number of unit bits r may be smaller than the number of bits z set by the mode setting register 55. In this case, the precision switching circuit 61a1 may extract the weight coefficients at the set number of bits z by coupling a plurality of unit bit strings read by the selector.

Note that the precision switching circuit 61a1 is also connected to the SRAM 60a2 included in the LFE 51a2. As will be described below, the precision switching circuit 61a1 can also read the weight coefficients from the SRAM 60a2.

The $\Delta h$ generation unit 62a1 receives the current bit value of the inversion bit (bit value before the inversion this time) from the random selector unit 52, and calculates a change amount $\Delta h_0$ of a local field $h_0$ by the expression (4) using the weight coefficients acquired from the precision switching circuit 61a1. The $\Delta h$ generation unit 62a1 outputs $h_0$ to the adder 63a1.

The adder 63a1 adds $\Delta h_0$ to the local field $h_0$ stored in the h storage register 64a1 and outputs the local field $h_0$ to the h storage register 64a1.

The h storage register 64a1 takes in the value (the local field $h_0$) output by the adder 63a in synchronization with a clock signal (not illustrated). The h storage register 64a1 is, for example, a flip-flop. Note that an initial value of the local field $h_0$ stored in the h storage register 64a1 is a bias coefficient $b_0$. The initial value is set by the control unit 25a.

The inversion determination unit 65a1 receives the index=j of the inversion bit and the flag $F_j$ indicating the inversion availability from the random selector unit 52, and determines whether the own bit has been selected as the inversion bit. In a case where the own bit has been selected as the inversion bit, the inversion determination unit 65a1 inverts the spin bit stored in the bit storage register 66a1.

The bit storage register 66a1 holds the spin bit corresponding to the LFE 51a1. The bit storage register 66a1 is, for example, a flip-flop. The spin bit stored in the bit storage register 66a1 is inverted by the inversion determination unit 65a1. The bit storage register 66a1 outputs spin bit to the $\Delta E$ generation unit 67a1 and the random selector unit 52.

The $\Delta E$ generation unit 67a1 calculates an energy change amount $\Delta E_0$ of the Ising model according to the inversion of the own bit by the expression (2) on the basis of the local field $h_0$ of the h storage register 64a1 and the spin bit of the bit storage register 66a1. The $\Delta E$ generation unit 67a1 outputs the energy change amount $\Delta E_0$ to the determination unit 68a1 and the random selector unit 52.

The determination unit 68a1 outputs a flag $F_0$ indicating whether to allow the inversion of the own bit (indicating the inversion availability of the own bit) to the random selector unit 52 by comparing the energy change amount $\Delta E_0$ output by the DE generation unit 67a1 and the threshold generated by the threshold generation unit 53. Specifically, the determination unit 68a1 outputs $F_0=1$ (inversion available) when $\Delta E_0$ is smaller than the threshold value $-(T \cdot f^{-1}(u))$, and outputs $F_0=0$ (inversion unavailable) when $M_0$ is equal to or larger than the threshold value $-(T \cdot f^{-1}(u))$. Here, $f^{-1}(u)$ is a function given in either the expression (9) or (10) according to an applicable law. Furthermore, u is a uniform random number in the interval [0,1).

The random selector unit 52 receives the energy change amount, the flag indicating the inversion availability of the spin bit, and the spin bit from each of the LFEs 51a1, 51a2, . . . , and 51an, and selects the bit to be inverted (inversion bit) from among the inversion-available spin bits.

The random selector unit 52 supplies the current bit value (bit $q_j$) of the selected inversion bit to the $\Delta h$ generation units 62a1, 62a2, . . . , and 62an included in the LFEs 51a1, 51a2, . . . , and 51an. The random selector unit 52 is an example of the selection circuit unit 2 of the first embodiment.

The random selector unit 52 outputs the index=j of the inversion bit and the flag $F_j$ indicating the inversion availability to the SRAMs 60a1, 60a2, . . . , and 60an included in the LFEs 51a1, 51a2, . . . , and 51an. Note that, as described above, the random selector unit 52 may output the index=j of the inversion bit and the flag $F_j$ indicating the inversion availability to the precision switching circuits 61a1, 61a2, . . . , and 61an included in the LFEs 51a1, 51a2, . . . , and 51an.

Furthermore, the random selector unit 52 supplies the index=j of the inversion bit and the flag $F_j$ indicating the inversion availability to the inversion determination units 65a1, 65a2, . . . , and 65an included in the LFEs 51a1, 51a2, . . . , and 51an.

Moreover, the random selector unit 52 supplies $\Delta E_j$ corresponding to the selected inversion bit to the adder 56.

Here, the random selector unit 52 receives the setting of the number of spin bits (that is, the number of LFEs to be used) in a certain Ising model from the mode setting register 55. For example, the random selector unit 52 enables a search for solution, using a number of LFEs corresponding to the set number of spin bits in order from the smallest index. For example, in a case of using K LFEs of n LFEs, the random selector unit 52 selects the inversion bit from the spin bit string corresponding to the LFEs of the LFEs 51a1, . . . , and 51aK. At this time, it is conceivable that, for example, the random selector unit 52 forcibly sets the flag F output from each of the unused n−K LFEs 51a(K−1), . . . , and 51an to 0.

The threshold generation unit 53 generates and supplies the threshold to be used for comparison with the energy change amount $\Delta E$ to the determination units 68a1, 68a2, . . . , and 68an included in the LFEs 51a1, 51a2, . . . , and 51an. As described above, the threshold generation unit 53 generates the threshold using the temperature parameter T, the uniform random number u in the interval [0,1), and $f^{-1}(u)$ illustrated in the expression (9) or (10). The threshold generation unit 53 individually includes a random number generation unit for each LIFE, for example, and generates the threshold using the random number u for each LFE. Note that the random number generation unit may be shared by some LFEs. The initial value of the temperature parameter T and a decrease cycle, a decrease amount of the temperature parameter T in the simulated annealing, and the like are controlled by the control unit 25a.

The random number generation unit 54 generates a random number bit to be used for selecting the inversion bit in the random selector unit 52, and supplies the random number bit to the random selector unit 52.

The mode setting register 55 supplies a signal indicating the number of bits of the weight coefficients (that is, precision) to the precision switching circuits 61a1, 61a2, and 61an included in the LFEs 51a1, 51a2, . . . , and 51an. Furthermore, the mode setting register 55 supplies a signal indicating the number of spin bits (that is, scale) to the random selector unit 52. The control unit 25a sets the number of spin bits and the number of bits of the weight coefficients for the mode setting register 55. The mode setting register 55 is an example of the setting change unit 5 of the first embodiment.

The adder 56 adds the energy change amount $\Delta E_j$ output by the random selector unit 52 to the energy value E stored in the E storage register 57, and outputs the energy value E to the E storage register 57.

The E storage register 57 takes in the energy value E output by the adder 56 in synchronization with a dock signal (not illustrated). The E storage register 57 is, for example, a flip-flop. Note that the initial value of the energy value E is calculated by the control unit 25a using the expression (1) and set in the E storage register 57.

For example, in the case of using K LFEs for searching for a solution, the control unit 25*a* obtains the spin bit string by reading each spin bit of the bit storage registers 66*a*1, . . . , and 66*a*K.

Figure 9:
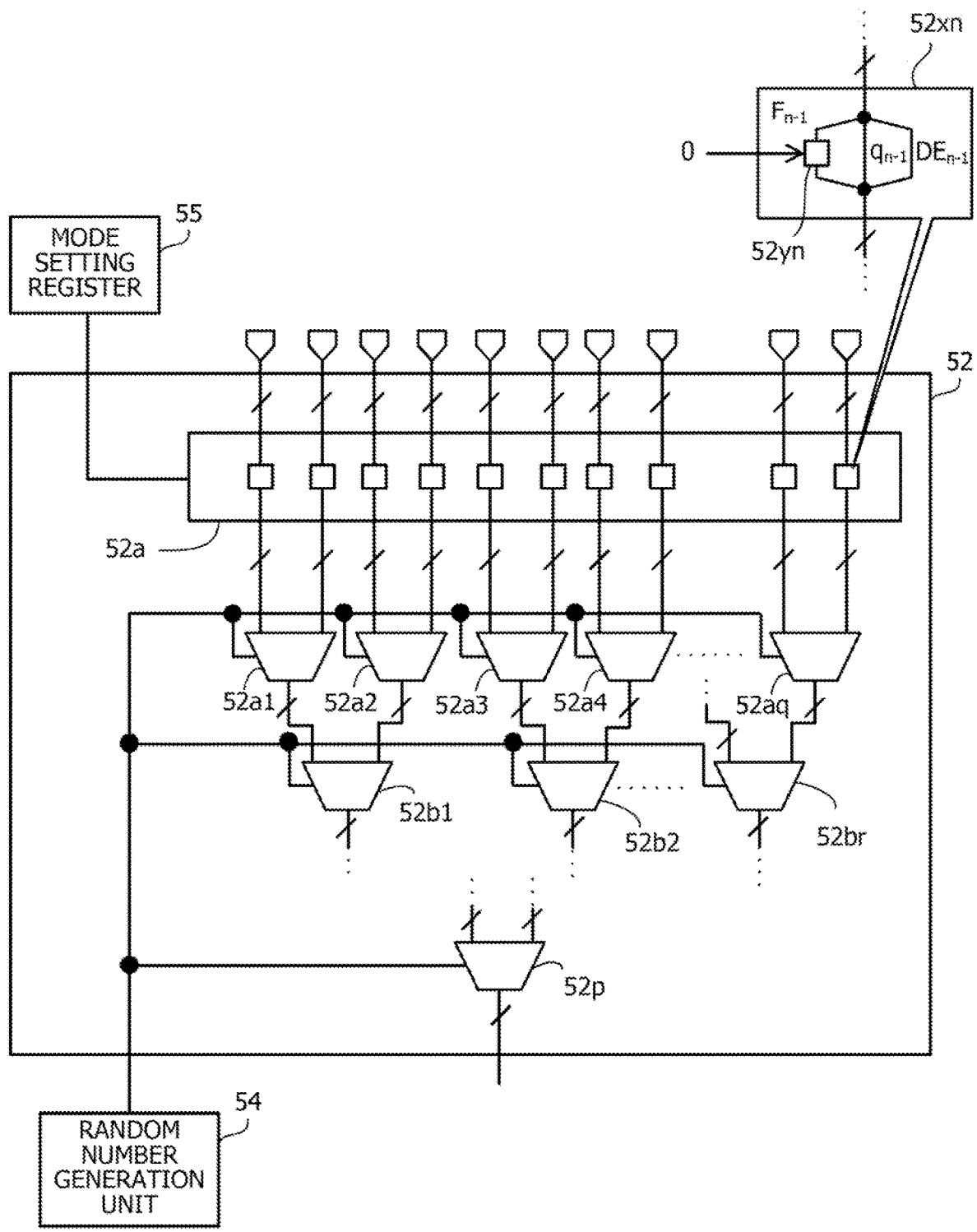
FIG. 9 is a diagram illustrating a circuit configuration example of a random selector unit.

FIG. 9 is a diagram illustrating a circuit configuration example of the random selector unit.

The random selector unit 52 includes a flag control unit 52*a* and a plurality of selection circuits connected in a tree shape over a plurality of stages.

The flag control unit 52*a* controls the value of the flag input to each of the selection circuits 52*a*1, 52*a*2, 52*a*3, 52*a*4, . . . , and 52*aq* in the first stage according to the setting of the number of spin bits of the mode setting register 55. FIG. 9 illustrates a partial circuit 52*xn* that controls the value of the flag for one input of the selection circuit 52*aq* (corresponding to the output of the LFE 51*an*). A flag setting unit 52*yn* of the partial circuit 52*xn* is a switch for forcibly setting a flag Fn output from the unused LFE 51*an* to 0.

Two sets of variables $q_i$, $F_i$, and $\Delta E_i$ output by two of the LFEs 51*a*1, 51*a*2, . . . , and 51*an* are input to each of the selection circuits 52*a*1, 52*a*2, 52*a*3, 52*a*4, . . . , and 52*aq* in the first stage. For example, a set of variables $q_0$, $F_0$, and $\Delta E_0$ output by the LFE 51*a*1 and a set of variables $q_1$, $F_1$, and $\Delta E_1$ output by the LFE 51*a*2 are input to the selection circuit 52*a*1. Furthermore, a set of variables $q_2$, $F_2$, and $\Delta E_2$ and a set of variables $q_3$, $F_3$, and $\Delta E_3$ are input to the selection circuit 52*a*2, and a set of variables $q_4$, $F_4$, and $\Delta E_4$ and a set of variables $q_5$, $F_5$, and $\Delta E_5$ are input to the selection circuit 52*a*3. Moreover, a set of variables $q_6$, $F_6$, and $\Delta E_6$ and a set of variables $q_7$, $F_7$, and $\Delta E_7$ are input to the selection circuit 52*a*4, and a set of variables $q_{n-2}$, $F_{n-2}$, and $\Delta E_{n-2}$, and a set of variables $q_i$, $F_i$, and $\Delta E_{n-1}$ are input to the selection circuit 52*aq*.

Then, each of the selection circuits 52*a*1, . . . , and 52*aq* has one set of variables $q_i$, $F_i$, and $\Delta E_i$ on the basis of the input two sets of variables $q_i$, $F_i$, and $\Delta E_i$, and the 1-bit random number output by the random number generation unit 54. At this time, each of the selection circuits 52*a*1, . . . , and 52*aq* preferentially selects the set having $F_i$ of 1, or selects any one set on the basis of the 1-bit random number in a case where both the sets have $F_i$ of 1 (which similarly applies to the other selection circuits). Here, the random number generation unit 54 individually generates the 1-bit random number for each selection circuit and supplies the 1-bit random number to each selection circuit. Furthermore, each of the selection circuits 52*a*1, . . . , and 52*aq* generates a 1-bit identification value indicating which set of variables $q_i$, $F_i$, and $\Delta E_i$ is selected, and outputs a signal (called state signal) including the selected variables $q_i$, $F_i$, and $\Delta E_i$ and the identification value. Note that the number of selection circuits 52*a*1 to 52*aq* in the first stage is ½ of the number of the LFEs 51*a*1, . . . , and 51*an*, that is, n/2.

Two state signals output by the selection circuits 52*a*1, . . . , and 52*aq* are input to each of the selection circuits 52*b*1, 52*b*2, . . . , and 52*br* in the second stage. For example, the state signals output by the selection circuits 52*a*1 and 52*a*2 are input to the selection circuit 52*b*1, and the state signals output by the selection circuits 52*a*3 and 52*a*4 are input to the selection circuit 52*b*2.

Then, each of the selection circuits 52*b*1, . . . , and 52*br* selects one of the two state signals on the basis of the two state signals and the 1-bit random number output by the random number generation unit 54.

Furthermore, each of the selection circuits 52*b*1, . . . , and 52*br* updates the identification value included in the selected state signal by adding one bit to indicate which state signal has been selected, and outputs the selected state signal.

Similar processing is performed in the selection circuits in the third and subsequent stages. The bit width of the identification value is increased by one bit in the selection circuit at each stage. The selection circuit 52*p* in the last stage outputs a state signal that is the output of the random selector unit 52. The identification value included in the state signal output by the random selector unit 52 is an index indicating the inversion bit expressed by a binary number.

Note that the random selector unit 52 may output the index corresponding to the inversion bit by receiving, from each LFE, the index corresponding to the LFE together with the flag F, and selecting the index using each selection circuit, similarly to the variables $q_i$, $F_i$, and $\Delta E_i$. In this case, each LFE includes a register for storing the index, and outputs the index from the register to the random selector unit 52.

In this way, the random selector unit 52 forcibly sets the signals indicating the inversion availability output by the LFEs 51*a*(K+1), . . . , and 51*an* other than the LFEs 51*a*1, . . . , and 51*a*K of the set number of spin bits K to be inversion unavailable, of the LFEs 51*a*1, . . . , and 51*an*. The random selector unit 52 selects the inversion bit on the basis of the signals indicating the inversion availability output by the LFEs 51*a*1, . . . , and 51*a*K and the signals indicating inversion unavailable set for the LFEs 51*a*(K+1), . . . , and 51*an*. The random selector unit 52 outputs the signal indicating the inversion bit to the LFEs 51*a* (K+1), . . . , 51*an* in addition to the LFEs 51*a*1, . . . , and 51*a*K.

In this way, the flag F of the unused LFE is forcibly set to 0 by the control of the flag control unit 52*a*, so that the bit corresponding to the LFE not used in the spin bit string can be excluded from the inversion candidates.

Next, a storage example of the weight coefficient for each of the SRAMs 60*a*1, 60*a*2, . . . , and 60*an* of the LFEs 51*a*1, . . . , and 51*an* will be described. First, a trade-off relationship between the scale and precision with respect to an SRAM capacity will be described.

Figure 10:
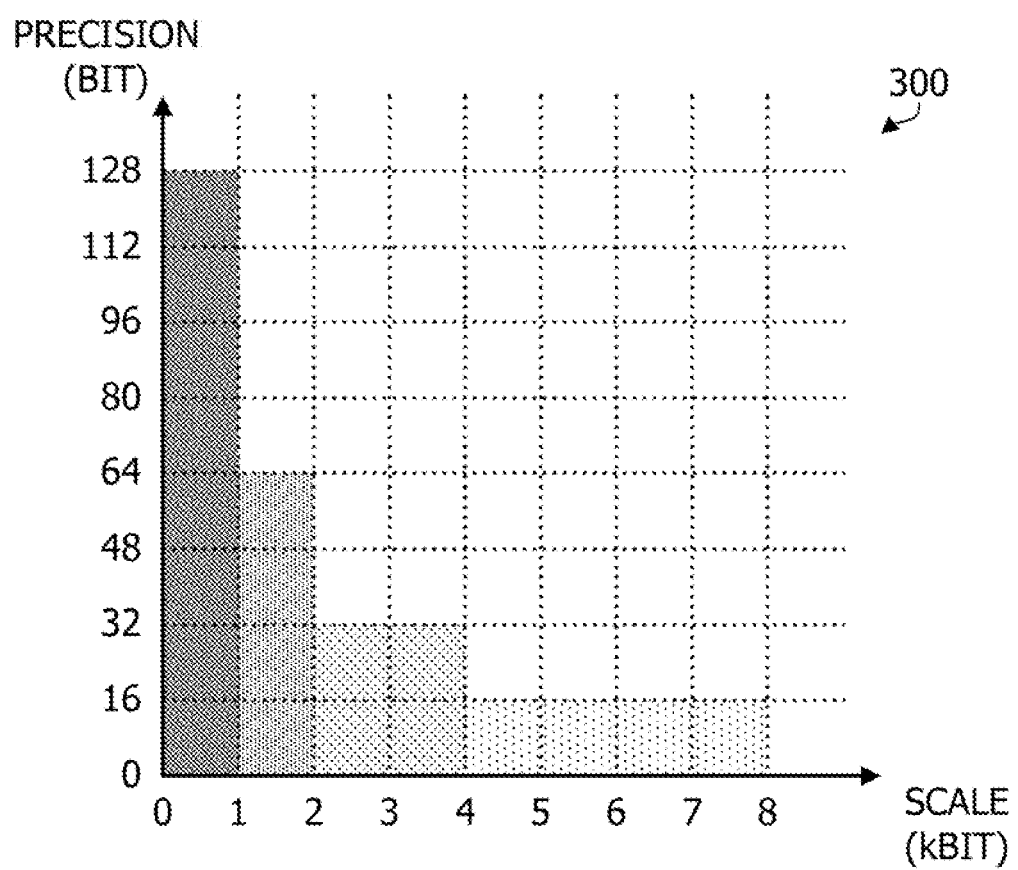
FIG. 10 is a diagram illustrating an example of a trade-off relationship between scale and precision.

FIG. 10 is a diagram illustrating an example of the trade-off relationship between the scale and precision.

As described above, an example of the combinatorial optimization problem is the traveling salesman problem. The traveling salesman problem is a problem of low precision when the number of cities to travel is large and the number of traveling conditions (travel time, travel distance, travel cost, and the like) is small, and requires high precision when the number of traveling conditions is large. In addition, examples of an optimization problem with relatively low precision include problems with certain conditions such as eight queens problems and four-color problems. Meanwhile, portfolio optimization problems require high precision because there are many conditions such as amount of money and period.

When the SRAM capacity for each LFE is limited, there is a trade-off relationship between the scale and precision. Graph 300 illustrates a trade-off relationship between the scale and precision in a case where an upper limit of the capacity for storing the weight coefficients in the SRAM for each LFE is 128 k (kilo) bits. Here, 1 k (kilo)=1024. The horizontal axis of the graph 300 represents the scale (k bits), and the vertical axis represents the precision (bits). Note that, as an example, it is assumed that n=8192.

In this case, the maximum precision is 128 bits for 1-kbit scale. Furthermore, the maximum precision is 64 bits for 2-kbit scale. The maximum precision is 32 bits for 4-kbit scale. The maximum precision is 16 bits for 8-kbit scale.

Therefore, in the optimization device 25, for example, the following four modes are made available. The first mode is a 1-kbit scale/128-bit precision mode. The second mode is a 2-kbit scale/64-bit precision mode. The third mode is a 4-kbit scale/32-bit precision mode. The fourth mode is an 8-kbit scale/16-bit precision mode. Next, a storage example of the weight coefficient corresponding to each of the four modes will be described. The weight coefficient is stored in each of the SRAMs 60a1, 60a2, . . . , and 60an by the control unit 25a. Note that the number of unit bits read from the SRAMs 60a1, 60a2, . . . , and 60an by each selector of the precision switching circuits 61a1, 61a2, . . . , and 61an is assumed to be 128 bits as an example.

Figure 11:
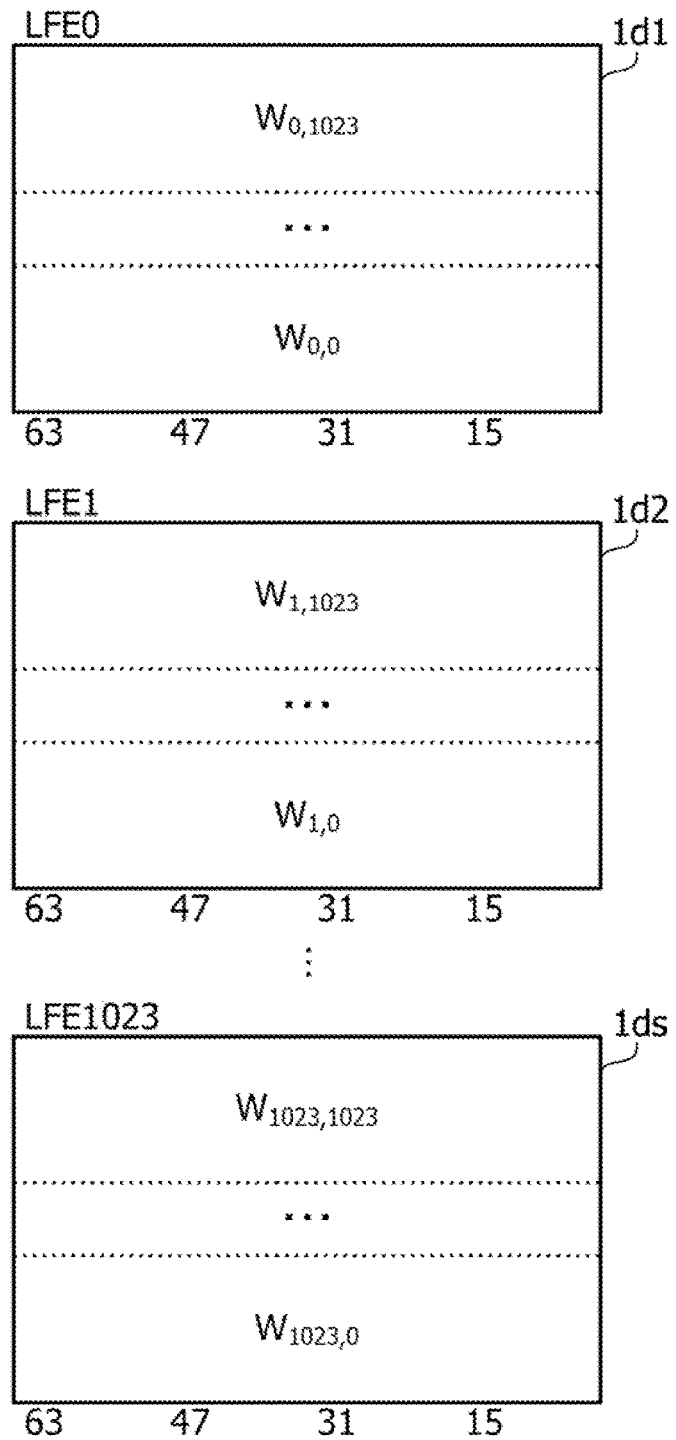
FIG. 11 is a diagram illustrating a storage example of weight coefficients (No. 1).

FIG. 11 is a diagram illustrating a storage example of weight coefficients (No. 1).

In the case of using the above-described first mode (1-kbit scale/128-bit precision), the weight coefficients W are expressed by the expression (11).

[Math. 11]

$$W = \begin{pmatrix} W_{0,0} & \cdots & W_{0,1023} \\ \vdots & \ddots & \vdots \\ W_{1023,0} & \cdots & W_{1023,1023} \end{pmatrix} \quad (11)$$

Data 1d1, 1d2, . . . , and 1ds are storage examples of the weight coefficients for the SRAMs 60a1, 60a2, . . . , and 60as in the case of using the above-described first mode (1-kbit scale/128-bit precision). Here, s=1024. The data 1d1, 1d2, . . . , and 1ds are stored in the SRAMs 60a1, 60a2, . . . , and 60as, respectively. In this mode, 1 k (=1024) LFEs are used. Note that, in FIG. 11, the LFEs 51a1, . . . , and 51as may be expressed as LFE0, . . . , and LFE1023 using the respective identification numbers (which similarly applies to the following drawings).

The data 1d1 indicates $W_{0,0}$ to $W_{0,1023}$ stored in the SRAM 60a1 of the LFE 51a1 (LFE0). The data 1d2 indicates $W_{1,0}$ to $W_{1,1023}$ stored in the SRAM 60a2 of the LFE 51a2 (LFE1). The data 1ds indicates $W_{1023,0}$ to $W_{1023,1023}$ stored in the SRAM 6as of the LFE 51as (LFE1023). The number of bits of one weight coefficient $W_{ij}$ is 128 bits.

Figure 12:
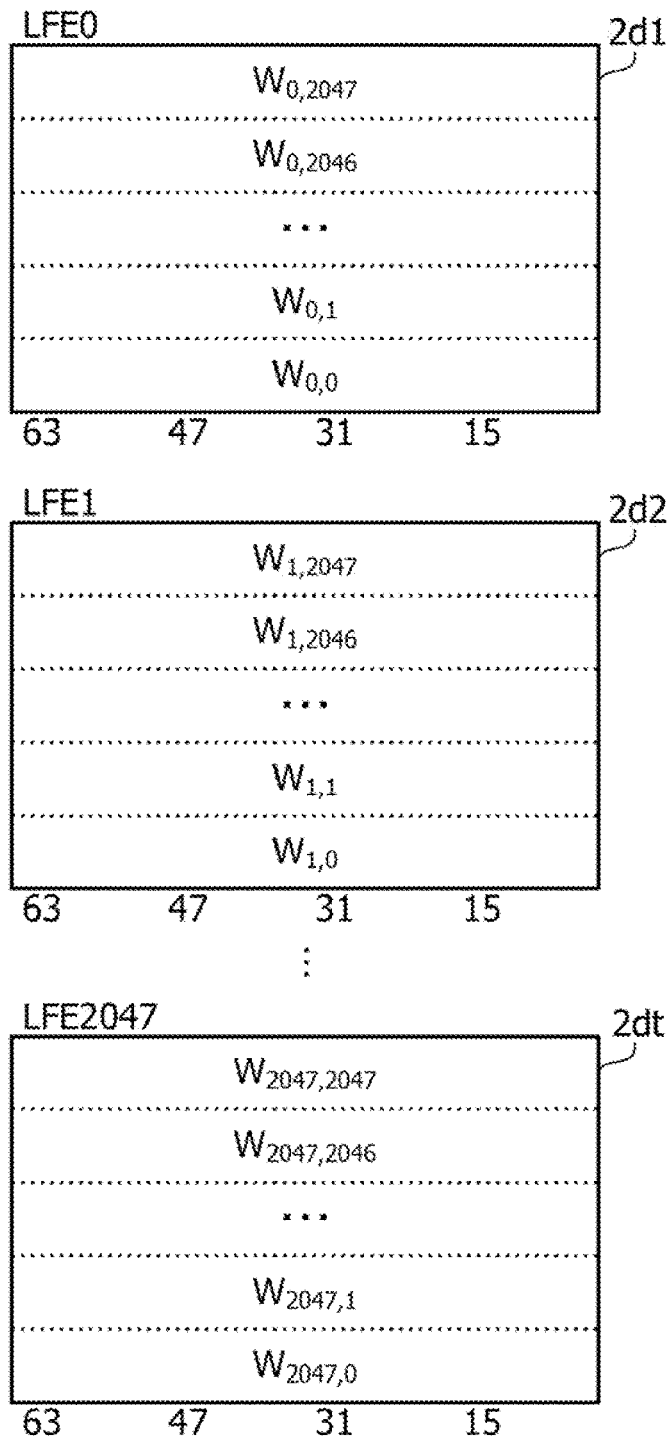
FIG. 12 is a diagram illustrating a storage example of weight coefficients (No. 2).

FIG. 12 is a diagram illustrating a storage example of weight coefficients (No. 2).

In the case of using the above-described second mode (2-kbit scale/64-bit precision), the weight coefficients W are expressed by the expression (12).

[Math. 12]

$$W = \begin{pmatrix} W_{0,0} & \cdots & W_{0,2047} \\ \vdots & \ddots & \vdots \\ W_{2047,0} & \cdots & W_{2047,2047} \end{pmatrix} \quad (12)$$

Data 2d1, 2d2, . . . , and 2dt are storage examples of the weight coefficients for the SRAMs 60a1, 60a2, . . . , and 60at in the case of using the above-described second mode (2-kbit scale/64-bit precision). Here, t=2048. The data 2d1, 2d2, . . . , and 2dt are stored in the SRAMs 60a1, 60a2, . . . , and 60at, respectively. In this mode, 2 k (=2048) LFEs are used.

The data 2d1 indicates $W_{0,0}$ to $W_{0,2047}$ stored in the SRAM 60a1 of the LFE 51a1 (LFE0). The data 2d2 indicates $W_{1,0}$ to $W_{1,2047}$ stored in the SRAM 60a2 of the LFE 51a2 (LFE1). The data 2dt indicates $W_{2047,0}$ to $W_{2047,2047}$ stored in the SRAM 60at of the LFE 51at (LFE2047). The number of bits of one weight coefficient $W_{ij}$ is 64 bits.

Figure 13:
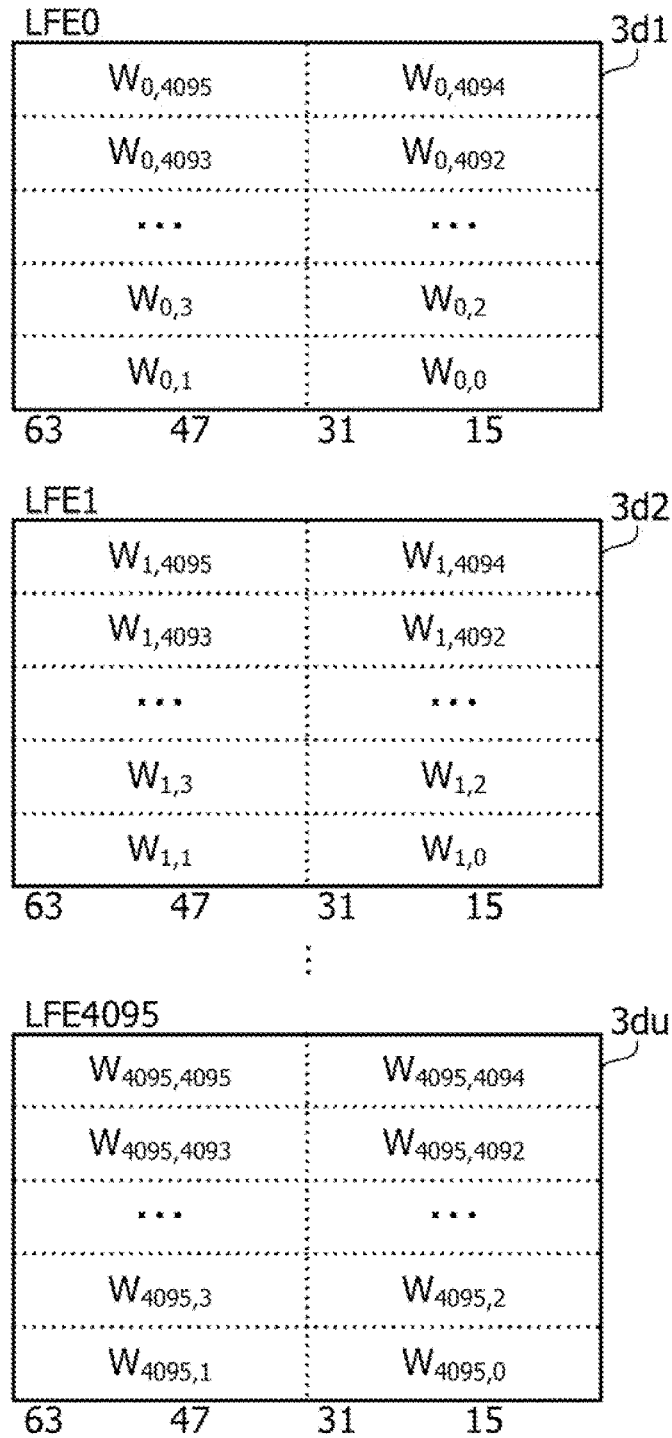
FIG. 13 is a diagram illustrating a storage example of weight coefficients (No. 3).

FIG. 13 is a diagram illustrating a storage example of weight coefficients (No. 3).

In the case of using the above-described third mode (4-kbit scale/32-bit precision), the weight coefficients W are expressed by the expression (13).

[Math. 13]

$$W = \begin{pmatrix} W_{0,0} & \cdots & W_{0,4095} \\ \vdots & \ddots & \vdots \\ W_{4095,0} & \cdots & W_{4095,4095} \end{pmatrix} \quad (13)$$

Data 3d1, 3d2, . . . , and 3du are storage examples of the weight coefficients for the SRAMs 60a1, 60a2, . . . , and 60au in the case of using the above-described third mode (4-kbit scale/32-bit precision). Here, u=4096. The data 3d1, 3d2, . . . , and 3du are stored in the SRAMs 60a1, 60a2, . . . , and 60au, respectively. In this mode, 4 k (=4096) LFEs are used.

The data 3d1 indicates $W_{0,0}$ to $W_{0,4095}$ stored in the SRAM 60a1 of the LFE 51a1 (LFE0). The data 3d2 indicates $W_{1,0}$ to $W_{1,4095}$ stored in the SRAM 60a2 of the LFE 51a2 (LFE1). The data 3du indicates $W_{4095,0}$ to $W_{4095,4095}$ stored in the SRAM 60au of the LFE 51au (LFE4095). The number of bits of one weight coefficient $W_{ij}$ is 32 bits.

FIG. 14 is a diagram illustrating a storage example of weight coefficients (No. 4).

In the case of using the above-described fourth mode (8-kbit scale/16-bit precision), the weight coefficients W are expressed by the expression (14).

[Math. 14]

$$W = \begin{pmatrix} W_{0,0} & \cdots & W_{0,8191} \\ \vdots & \ddots & \vdots \\ W_{8191,0} & \cdots & W_{8191,8191} \end{pmatrix} \quad (14)$$

Data 4d1, 4d2, . . . , and 4dn are storage examples of the weight coefficients for the SRAMs 60a1, 60a2, . . . , and 60an in the case of using the above-described fourth mode (8-kbit scale/16-bit precision). Here, n=8192. The data 4d1, 4d2, . . . , and 4dn are stored in the SRAMs 60a1, 60a2, . . . , and 60an, respectively. In this mode, 8 k (=8192) LFEs are used.

The data 4d1 indicates $W_{0,0}$ to $W_{0,8191}$ stored in the SRAM 60a1 of the LFE 51a1 (LFE0). The data 4d2 indicates $W_{1,0}$ to $W_{1,8191}$ stored in the SRAM 60a2 of the LFE 51a2 (LFE1). The data 4dn indicates $W_{8191,0}$ to $W_{8191,8191}$ stored in the SRAM 60an of the LFE 51an (LFE8191). The number of bits of one weight coefficient $W_{ij}$ is 16 bits.

Next, a processing procedure of the optimization device 25 will be described. First, an example of initialization processing of the optimization device 25 will be described.

Figure 15:
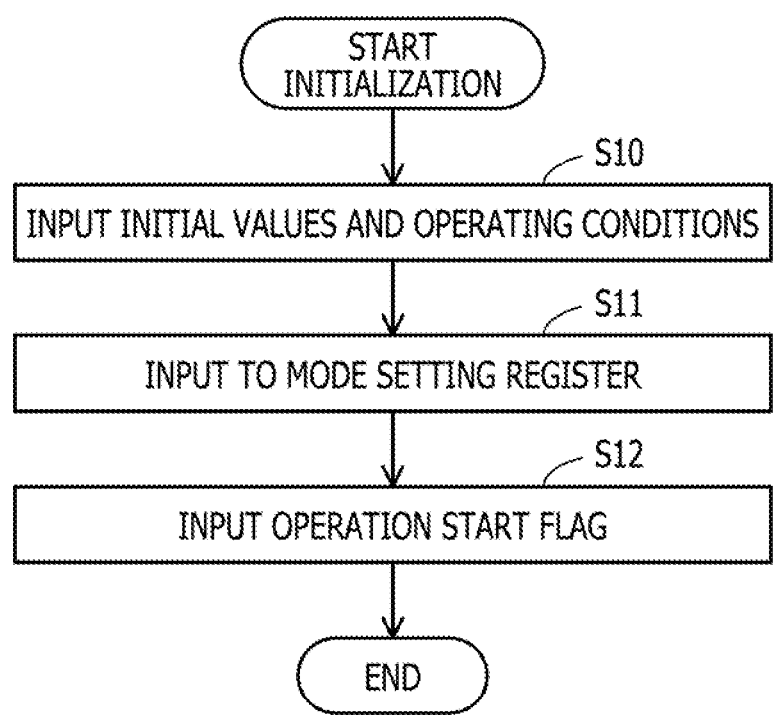
FIG. 15 is a flowchart illustrating an example of initialization processing.

FIG. 15 is a flowchart illustrating an example of the initialization processing.

(S10) The CPU 21 inputs the initial values and operating conditions according to the problem to the optimization device 25. The initial values include, for example, the energy value E, the local field $h_i$, the spin bit $q_i$, the initial value of the temperature parameter T, the weight coefficients W, and the like. Furthermore, the operating conditions include the number of update times N1 of the state with one temperature parameter, the number of change times N2 of the temperature parameter, a range of reduction of the temperature parameter, and the like. The control unit 25a sets the input initial values and the weight coefficients in the registers and SRAMs of each LFE described above. Note that, in a case where there is an unused LFE, the control unit 25*a* sets 0 as W in the SRAM of each LFE, for example. The weight coefficient W between spin bits is expressed by the number of bits corresponding to the predsion according to the problem.

(S11) The CPU 21 inputs the number of spin bits (scale) and the number of bits of the weight coefficients (predsion) according to the problem to the optimization device 25. The control unit 25*a* receives the number of spin bits and the number of bits of the weight coefficients from the CPU 21 and inputs them to the mode setting register 55. The number of bits of the weight coefficients input to the mode setting register 55 is input to the precision switching circuits of each LFE. Furthermore, the number of spin bits input to the mode setting register 55 is input to the random selector unit 52.

(S12) The CPU 21 inputs an operation start flag (for example, an operation start flag=1) to the optimization device 25. The control unit 25*a* receives the input of the operation start flag and starts the operation by the LFB 50. In this way, the initialization processing is completed.

Figure 16:
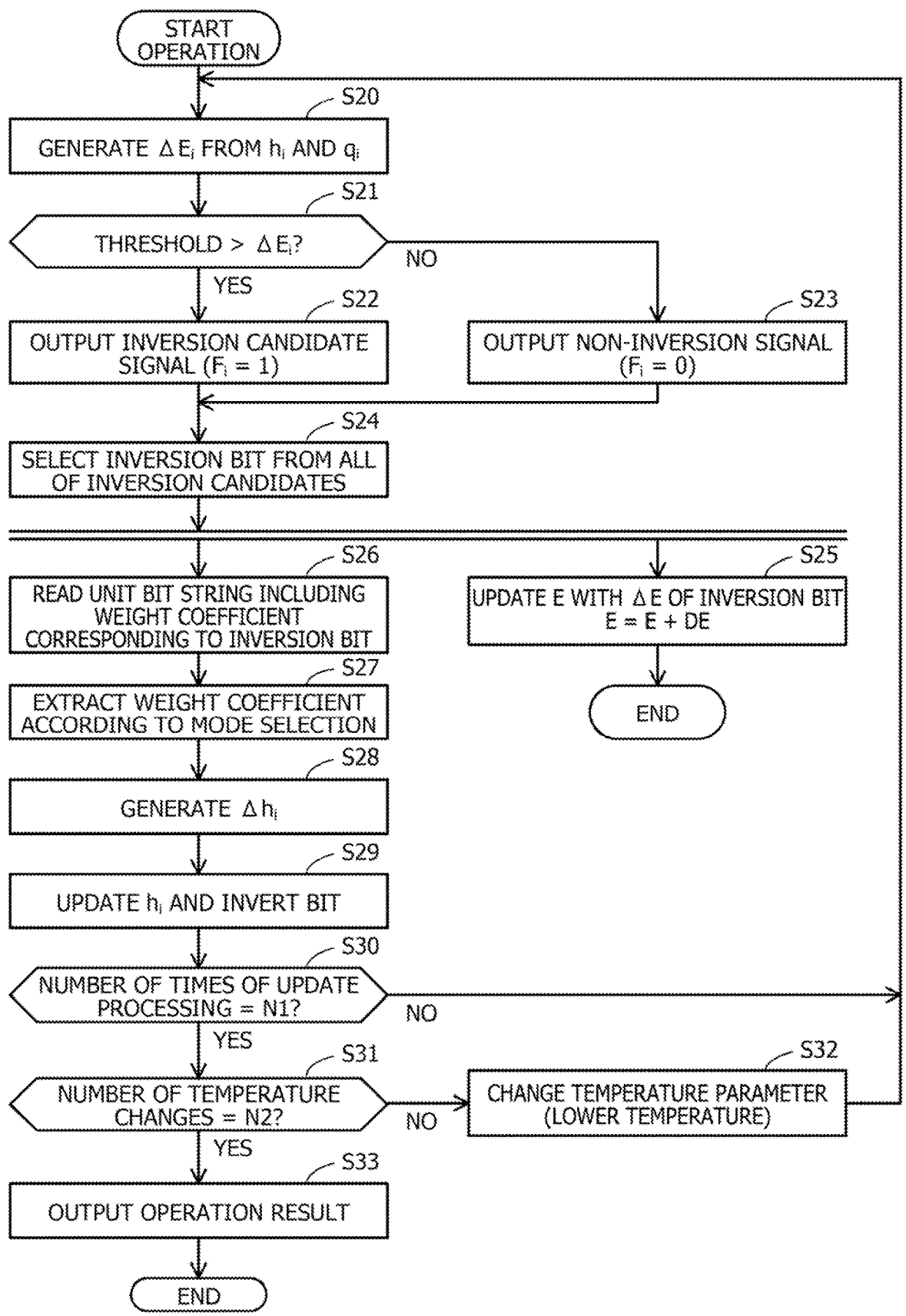
FIG. 16 is a flowchart illustrating an example of operation processing.

FIG. 16 is a flowchart illustrating an example of operation processing.

Here, in the description of FIG. 16, the LFE corresponding to the index=i is described as LFE 51*ax* (the first LFE is LFE 51*a*1 and the n-th LFE is LFE 51*an*). Each part included in the LFE 51*ax* is also described as, for example, SRAM 60*ax* by adding "x" to the end of the reference sign, for example. The operations by each of the LFEs 51*a*1, . . . , and 51*an* are executed in parallel.

(S20) The ΔE generation unit 67*ax* generates the energy change amount $\Delta E_i$ in the case of inverting the bit $q_i$ on the basis of the local field $h_i$ stored in the h storage register 64*ax* and the bit $q_i$ stored in the bit storage register 66*ax*. The expression (2) is used to generate $\Delta E_i$.

(S21) The determination unit 68*ax* compares the energy change amount ΔE generated by the ΔE generation unit 67*ax* with the threshold value ($=-(T \cdot f^{-1}(u))$) generated by the threshold generation unit 53, and determines whether the threshold $>\Delta E_i$. In the case where the threshold $>\Delta E_i$, the processing proceeds to step S22. In the case where the threshold $\leq \Delta E_i$, the processing proceeds to step S23.

(S22) The determination unit 68*ax* outputs an inversion candidate signal ($F_i=1$) to the random selector unit 52. Then, the processing proceeds to step S24.

(S23) The determination unit 68*ax* outputs a non-inversion signal ($F_i=0$) to the random selector unit 52. Then, the processing proceeds to step S24.

(S24) The random selector unit 52 selects one inversion bit from among all the inversion candidates (bits corresponding to the LFE with $F_i=1$) output respectively from the LFEs 51*a*1, . . . , and 51*an*. The random selector unit 52 outputs the index=j, $F_j$, and $q_j$ corresponding to the selected inversion bit to the LFEs 51*a*1, . . . , and 51*an*. Furthermore, the random selector unit 52 outputs $\Delta E_j$ corresponding to the selected inversion bit to the adder 56. Then, next steps S25 (energy update processing) and S26 (state update processing) are started in parallel.

(S25) The adder 56 adds the energy change amount ΔE corresponding to the inversion bit to the energy value E to update the energy value E stored in the E storage register 57. That is, E=E+ΔE. Then, the energy update processing is completed.

(S26) The precision switching circuit 61*ax* acquires the index=j and the flag $F_j$ corresponding to the inversion bit, and reads the unit bit string including the weight coefficient corresponding to the inversion bit from the SRAM 60*ax*. The unit bit string is the unit of the bit string read from SRAM 60*ax* at a time by the selector of the precision switching circuit 61*ax*. The number of bits in the unit bit string (the number of unit bits) is 128 bits as one example (another value may be used). In this case, in step S26, the 128-bit unit bit string is read from the SRAM 60*ax*.

For example, in the case where 128/a (a=1, 2, 4, or 8) bits are selected as the precision, the precision switching circuit 61*ax* reads the (Integer(j/a))-th unit bit string counted from the beginning (0-th) unit bit string of the SRAM 60*ax*. Here, Integer (/a) is a function that extracts an integer part from the value of W/a).

(S27) The precision switching circuit 61*ax* extracts the weight coefficient $W_{ij}$ (weight coefficient corresponding to the inversion bit $q_j$) of a number of bits according to the mode selection set by the mode setting register 55 from the unit bit string read in step S26. For example, in the case of extracting a z-bit bit string from the 128-bit unit bit string, the precision switching circuit 61*ax* extracts z-bit weight coefficients by shifting a z-bit bit range corresponding to the inversion bit toward the LSB side, and setting 0 to the other upper bits.

Note that the precision switching circuit 61*ax* specifies the bit range according to what number section from the beginning (0-th) section the bit range corresponding to the inversion bit corresponds to when the unit bit string read in step S26 is divided into bit-length sections according to the precision from the beginning.

According to the examples in FIGS. 12 to 14, in the case of 64-bit precision, the bit range corresponds to the 0-th section when j is an even number and the first section when j is an odd number. Furthermore, in the case of 32-bit precision, the bit range corresponds to the 0-th section in the case of mod (j, 4)-th=0, the first section in the case of mod (j, 4)=1, the second section in the case of mod (j, 4)=2, and the third section in the case of mod(, 4)=3. Here, mod (u, v) is a function that indicates a remainder when u is divided by v. Moreover, in the case of 16-bit precision, "mod (j, 8)"-th section from the beginning of the read 128-bit unit bit string is similarly the bit range corresponding to the inversion bit. Note that, in the case of 128-bit precision, the precision switching circuit 61*ax* sets the 128-bit unit bit string read in step S26 as the weight coefficient corresponding to the inversion bit as it is.

In the above example, for the 128/a (a=1, 2, 4, or 8)-bit precision, the "mod (, a)"-th section (the size of one section is 128/a bits) from the beginning of the 128-bit unit bit string read in step S26 is the bit range Indicating the weight coefficient corresponding to the inversion bit.

(S28) The Δh generation unit 62*ax* generates $\Delta h_i$ on the basis of an inversion direction of the inversion bit and the weight coefficient $W_{ij}$ extracted by the precision switching circuit 61*ax*. The expression (4) is used to generate $\Delta h_i$. Furthermore, the inversion direction of the inversion bit is determined according to the inversion bit $q_j$ (the bit before the inversion this time) output by the random selector unit 52.

(S29) The adder 63*ax* adds the $\Delta h_i$ generated by the Δh generation unit 62*ax* to the local field $h_i$ stored in the h storage register 64*ax* to update the local field $h_i$ stored in the h storage register 64*ax*. Furthermore, the inversion determination unit 65*ax* determines whether the own bit has been selected as the inversion bit on the basis of the index=j and the flag $F_j$ output by the random selector unit 52. The inversion determination unit 65*ax* inverts the spin bit stored in the bit storage register 66*ax* in the case where the own bit has been selected as the inversion bit, or maintains the spin bit in the bit storage register 66ax in the case where the own bit has not been selected as the inversion bit. Here, the case where the own bit has been selected as the inversion bit means a case where the index=j=i and $F_j=1$ for the signal output by the random selector unit 52.

(S30) The control unit 25a determines whether the number of times of update processing of each spin bit held in the LFEs 51a1, . . . , and 51an has reached N1 (the number of times of update processing=N1) in the current temperature parameter T. In the case where the number of times of update processing has reached N1, the processing proceeds to step S31. In the case where the number of times of update processing has not reached N1, the control unit 25a adds 1 to the number of times of update processing and advances the processing to step S20.

(S31) The control unit 25a determines whether the number of changes of the temperature parameter T has reached N2 (whether the number of temperature changes=N2). In the case where the number of temperature changes reaches N2, the processing proceeds to step S33. In the case where the number of temperature changes has not reached N2, the control unit 25a adds 1 to the number of temperature changes and advances the processing to step S32.

(S32) The control unit 25a changes the temperature parameter T. Specifically, the control unit 25a reduces the value of the temperature parameter T (corresponding to lowering the temperature) by the range of reduction according to the operating condition. Then, the processing proceeds to step S20.

(S33) The control unit 25a reads the spin bit stored in the bit storage register 66ax and outputs the spin bit as an operation result. Specifically, the control unit 25a reads the spin bits stored respectively in the bit storage registers 66a1, . . . , and 66aK corresponding to the number of spin bits K set by the mode setting register 55, and outputs the spin bits to the CPU 21. That is, the control unit 25a supplies the read spin bit string to the CPU 21. Then, the operation processing is completed.

Note that, in step S24, the random selector unit 52 forcibly sets the value of F output by an unused LFE to 0 according to the setting of the mode setting register 55, thereby excluding the unused LFE from the bit inversion candidates.

According to the optimization device 25, the mode setting register 55 enables setting of the number of spin bits representing the state of the Ising model and the number of bits of the weight coefficients, whereby the scale and precision suitable for the problem can be achieved in the one-chip optimization device 25.

More specifically, the precision switching circuit 61ax switches the bit length of the weight coefficient read from the SRAM 60ax according to the setting of the mode setting register 55. By using the precision switching circuit 61ax, as described in step S27, various precisions can be achieved without changing the number of unit bits read from the SRAM 60ax by the selector of the precision switching circuit 61ax. For example, the precision can be made variable without requiring remaking of the signal line for reading the number of unit bits from the SRAM 60ax by the selector of the precision switching circuit 61ax.

Furthermore, the random selector unit 52 inputs the signal indicating the inversion bit to the number of (for example, K) LFEs corresponding to the number of spin bits set by the mode setting register 55, and selects the inversion bit from among the bits corresponding to the number of (K) LFEs. The random selector unit 52 also inputs the signal indicating the inversion bit to the unused n–K LFEs, but excludes the unused LFEs from the inversion bit selection candidates by forcibly setting the flag F output from the n–K LFEs to 0 (inversion unavailable).

Thereby, the Ising model can be implemented by one optimization device 25 with the scale and precision according to the problem even if the optimization device having the scale and precision according to the problem is not individually manufactured.

Next, another example of the mode setting will be described. For example, the optimization device 25 stores the weight coefficients in the SRAMs 60a1, . . . , and 60an as follows, thereby providing a fifth mode of 4-kbit scale/64-bit precision, in addition to the above-described four modes.

Figure 17:
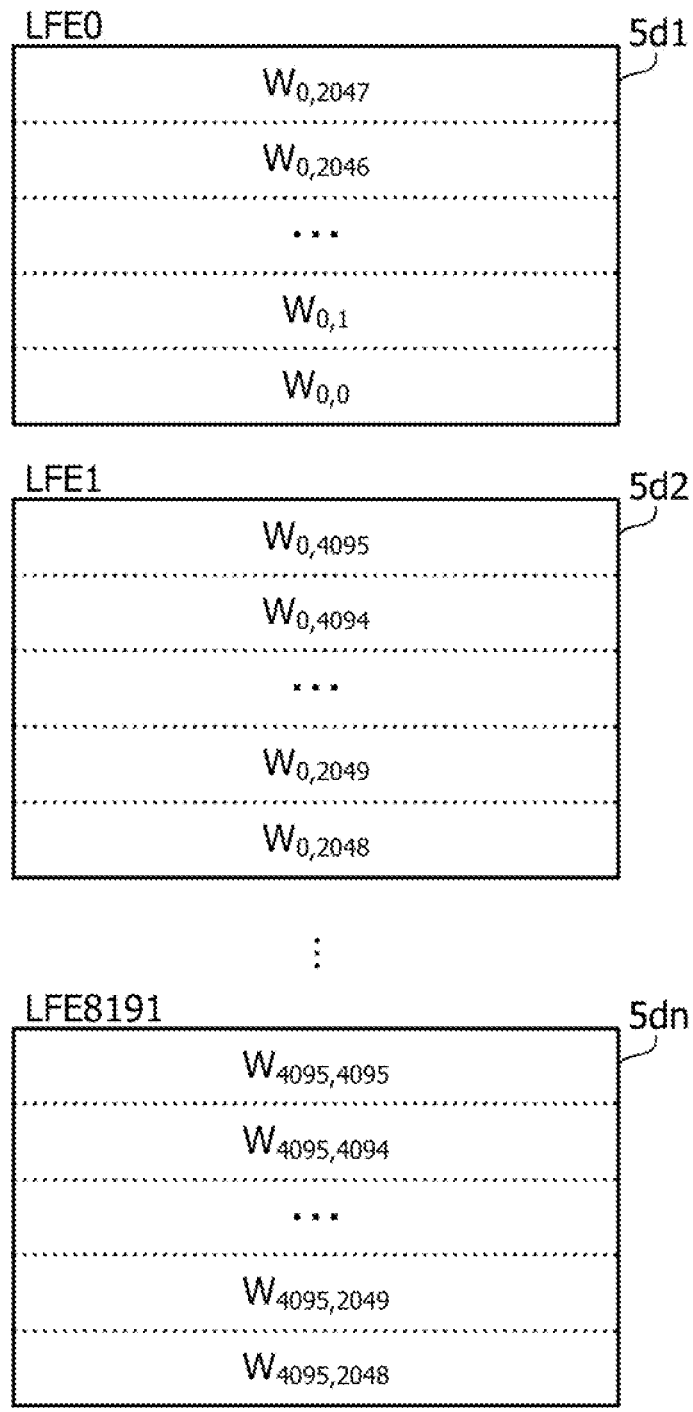
FIG. 17 is a diagram illustrating a storage example of coupling coefficients (No. 5).

FIG. 17 is a diagram illustrating a storage example of coupling coefficients (No. 5).

Data 5d1, 5d2, . . . , and 5dn are storage examples of the weight coefficients for the SRAMs 60a1, 60a2, . . . , and 60an in the case of using the above-described fifth mode (4-kbit scale/64-bit precision). Here, n=8192. The data 5d1, 5d2, . . . , and 5dn are stored in the SRAMs 60a1, 60a2, . . . , and 60an, respectively. In this mode, 4 k (=4096) LFEs are used as the spin bit string, and another 4 k (=4096) LFEs are used only for storing the weight coefficients.

The data 5d1 indicates $W_{0,0}$ to $W_{0,2047}$ stored in the SRAM 60a1 of the LFE 51a1 (LFE0). The data 5d2 indicates $W_{0,2048}$ to $W_{0,2048}$ stored in the SRAM 60a2 of the LFE 51a2 (LFE1). The data 5dn indicates $W_{4095,2048}$ to $W_{4095,4095}$ stored in the SRAM 60an of the LFE 51an (LFE8191). The number of bits of one weight coefficient $W_{ij}$ is 64 bits.

Here, as described above, the precision switching circuit 61a1 of the LFE 51a1 can also acquire the weight coefficient from the SRAM 60a2 of the LFE 51a2. That is, the precision switching circuit 61a1 can adopt a method of stopping the functions other than the SRAM 60a2 of the LFE 51a2 and lending the capacity of the SRAM 60a2 to the LFE 51a1 by using the readout route from the adjacent SRAM 60a2 of the LFE 51a2, for example. For example, the odd-numbered LFE (the LFE in the beginning is the first LFE) makes the SRAM of the even-numbered LFE available (or it can be said that the even-numbered LFE makes the SRAM of the odd-numbered LFE available in the case where the LIFE In the beginning is the 0-th LFE).

In this way, the precision switching circuit 61a1, . . . , or 61an reads a part of the weight coefficients related to the own bit and other bits from the SRAM included in another LFE unused as the spin bit according to the change in the number of bits of the weight coefficients. In this case, the random selector unit 52 may exclude the bit corresponding to the another LFE from the inversion bit selection candidates by forcibly setting the flag F output from the another LFE unused as the spin bit to 0 (inversion unavailable), for example.

Thereby, the fifth mode of the 4-kbit scale/64-bit precision can be implemented. Similarly, even greater precision can be achieved by reducing the scale. Thus, according to the optimization device 25, the scale and precision can be more flexibly changed according to the problem.

Third Embodiment

Next, a third embodiment will be described. Items different from the above-described second embodiment will be mainly described, and description of common items will be omitted.

The third embodiment provides a function to efficiently make LFEs available in addition to the functions of the second embodiment.

Here, since a device configuration of an information processing system and a hardware configuration of an information processing device 20 according to the third embodiment are similar to those in FIGS. 2 and 3, description thereof is omitted. An optimization device of the third embodiment is partially different from the optimization device 25 of the second embodiment in a circuit configuration.

Figure 18:
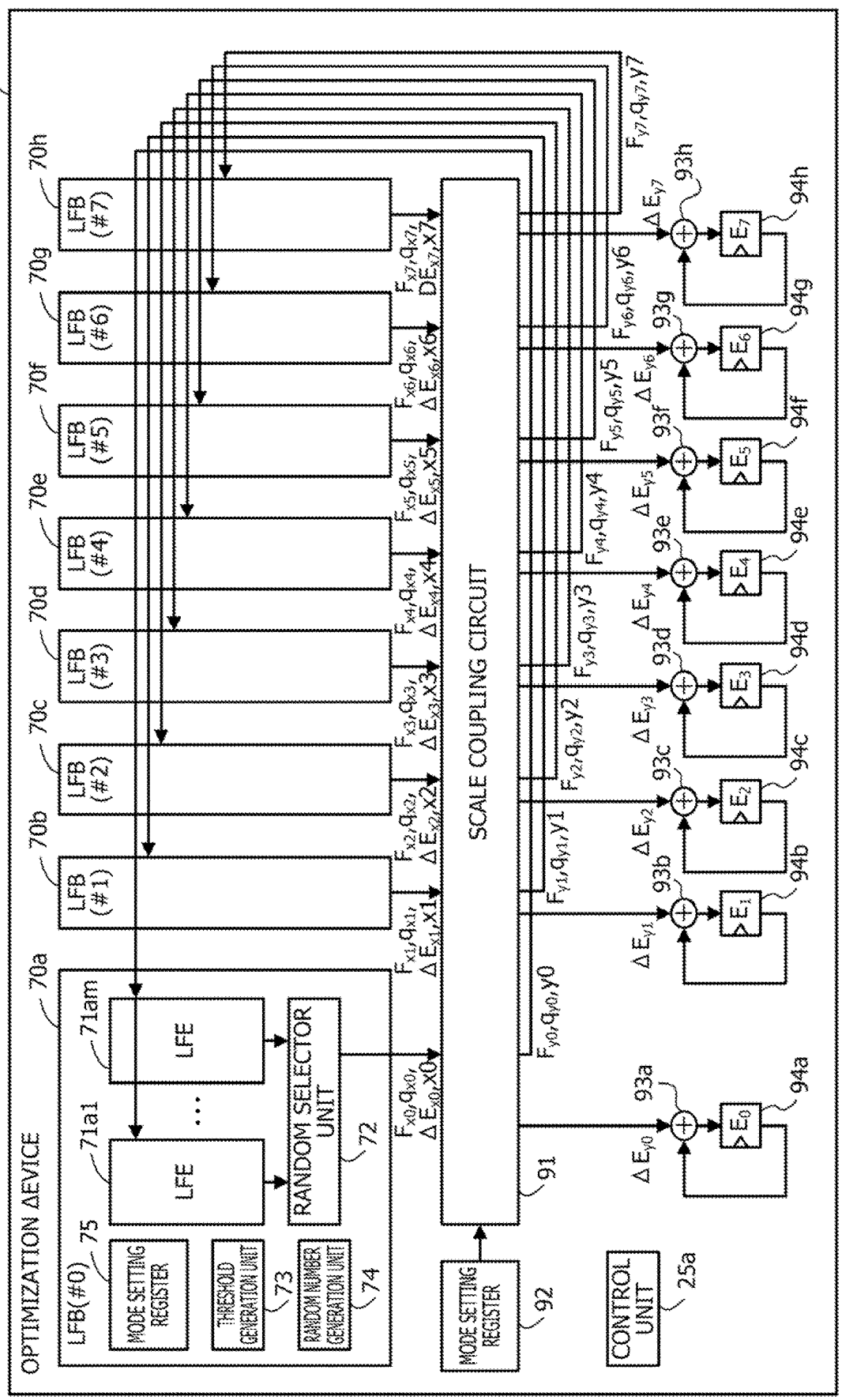
FIG. 18 is a diagram illustrating an example of an optimization device of a third embodiment.

FIG. 18 is a diagram illustrating an example of the optimization device of the third embodiment.

An optimization device 26 is, for example, a one-chip semiconductor integrated circuit, and is implemented by an FPGA or the like. The optimization device 26 is an example of the optimization device 1 according to the first embodiment. The optimization device 26 includes a plurality of LFBs. The optimization device 26 includes a control unit 25a that controls the plurality of LFBs (not illustrated).

In the third embodiment, as an example, the number of LFEs belonging to one LFB is m (m is an integer of 2 or larger), and the optimization device 26 includes LFBs 70a, 70b, 70c, 70d, 70e, 70f, 70g, and 70h. In this case, the optimization device 26 includes a total of 8 m LFEs and can implement a maximum scale of 8 m bits. Note that the number of LFBs included in the optimization device 26 is not limited to eight and may be another number.

The plurality of LFEs included in the LFBs 70a, . . . , and 70h are examples of the bit operation circuits 1a1, . . . , and 1aN of the first embodiment. Each of LFBs 70a, . . . , and 70h can be said to be one group of LFEs each including a predetermined number (m) of LFEs as elements. Furthermore, identification numbers #0 to #7 are assigned to the LFBs 70a, . . . , and 70h, respectively.

The optimization device 26 further includes a scale coupling circuit 91, a mode setting register 92, adders 93a, 93b, 93c, 93d, 93e, 93f, 93g, and 93h, and E storage registers 94a, 94b, 94c, 94d, 94e, 94f, 94g, and 94h.

Here, the LFB 70a includes LFEs 71a1, . . . , and 71am, a random selector unit 72, a threshold generation unit 73, a random number generation unit 74, and a mode setting register 75. Since the LFEs 71a1, . . . , and LFE 71am, the random selector unit 72, the threshold generation unit 73, the random number generation unit 74, and the mode setting register 75 correspond to the hardware of the same names in the second embodiment described with reference to FIG. 8, description is omitted. Note that the random selector unit 72 outputs a set of state signals (a flag $F_{x0}$, a spin bit $q_{x0}$, and an energy change amount $\Delta E_{x0}$) for a selected inversion bit to the scale coupling circuit 91. Furthermore, the random selector unit 72 does not have to include (but may include) the flag control unit 52a. For example, in the random selector unit 72, two state signals from the LFEs are input to each selection circuit in the first stage of the random selector unit 72 without going through the flag control unit 52a. Note that the LFBs 70b, . . . , and 70h have a similar circuit configuration to the LFB 70a.

The scale coupling circuit 91 receives the state signal from each of the LFBs 70a, . . . , and 70h, and selects an inversion bit on the basis of the state signal. The scale coupling circuit 91 supplies a signal regarding the inversion bit to each of the LFEs of the LFBs 70a, . . . , and 70h.

Specifically, the scale coupling circuit 91 outputs the flag $F_{y0}$, the bit $q_{y0}$, and the index=y0 indicating the inversion bit to the LFEs 71a1, . . . , and 71am of the LFB 70a1. Here, in the following drawings, the notation such as "index=x0" output by the random selector unit 72 and the scale coupling circuit 91 may be abbreviated as "x0". The scale coupling circuit 91 outputs the energy change amount $\Delta E_{y0}$ to the adder 93a.

Furthermore, the scale coupling circuit 91 supplies the flag $F_{y1}$, the bit $q_{y1}$, and the index=y1 indicating the inversion bit to each of the LFEs of the LFB 70b. The scale coupling circuit 91 outputs the energy change amount $\Delta E_{y1}$ to the adder 93b.

The scale coupling circuit 91 outputs the flag $F_{y2}$, the bit $g_{y2}$, and the index=y2 indicating the inversion bit to each of the LFEs of the LFB 70c. The scale coupling circuit 91 outputs the energy change amount $\Delta E_{y2}$ to the adder 93c.

The scale coupling circuit 91 outputs the flag $F_{y3}$, the bit $q_{y3}$, and the index=y3 indicating the inversion bit to each of the LFEs of the LFB 70d. The scale coupling circuit 91 outputs the energy change amount $\Delta E_{y3}$ to the adder 93d.

The scale coupling circuit 91 outputs the flag $F_{y4}$, the bit $q_{y4}$, and the index=y4 indicating the inversion bit to each of the LFEs of the LFB 70e. The scale coupling circuit 91 outputs the energy change amount $\Delta E_{y4}$ to the adder 93e.

The scale coupling circuit 91 outputs the flag $F_{y5}$, the bit $q_{y5}$, and the index=y5 indicating the inversion bit to each of the LFEs of the LFB 70f. The scale coupling circuit 91 outputs the energy change amount $\Delta E_{y5}$ to the adder 93f.

The scale coupling circuit 91 outputs the flag $F_{y6}$, the bit $q_{y6}$, and the index=y6 indicating the inversion bit to each of the LFEs of the LFB 70g. The scale coupling circuit 91 outputs the energy change amount $\Delta E_{y6}$ to the adder 93g.

The scale coupling circuit 91 outputs the flag $F_{y7}$, the bit $q_{y7}$, and the index=y7 indicating the inversion bit to each of the LFEs of the LFB 70h. The scale coupling circuit 91 outputs the energy change amount $\Delta E_{y7}$ to the adder 93h.

The random selector unit (including the random selector unit 72) included in each of the LFBs 70a, . . . , and 70h and the scale coupling circuit 91 are an example of the selection circuit unit 2 of the first embodiment.

The mode setting register 92 sets an operation mode for the scale coupling circuit 91. The mode setting register 92 sets, in the scale coupling circuit 91, the same operation mode as the operation mode set in the LFEs 71a1, . . . , and 71am and the random selector unit 72 by the mode setting register 75. Details of the mode setting by the mode setting registers 75 and 92 will be described below. The mode setting registers (including the mode setting register 75) included in each of the LFBs 70a, . . . , and 70h and the mode setting register 92 are an example of the setting change unit 5 of the first embodiment.

The adder 93a adds $\Delta E_{y0}$ to the energy value $E_0$ stored in the E storage register 94a to update the energy value $E_0$. The E storage register 94a takes in the energy value $E_0$ calculated by the adder 93a in synchronization with a dock signal (not illustrated), for example, (which similarly applies to the other E storage registers).

The adder 93b adds $\Delta E_{y1}$ to the energy value $E_1$ stored in the E storage register 94b to update the energy value $E_1$. The E storage register 94b takes in the energy value $E_1$ calculated by the adder 93b.

The adder 93c adds $\Delta E_{y2}$ to the energy value $E_2$ stored in the E storage register 94c to update the energy value $E_2$. The E storage register 94c takes in the energy value $E_2$ calculated by the adder 93c.

The adder 93d adds $\Delta E_{y3}$ to the energy value $E_3$ stored in the E storage register 94d to update the energy value $E_3$. The E storage register 94d takes in the energy value $E_3$ calculated by the adder 93d.

The adder 93e adds $\Delta E_{y4}$ to the energy value $E_4$ stored in the E storage register 94e to update the energy value $E_4$. The E storage register 94e takes in the energy value $E_4$ calculated by the adder 93e.

The adder 93f adds $\Delta E_y5$ to the energy value $E_5$ stored in the E storage register 94f to update the energy value $E_5$. The E storage register 94f takes in the energy value $E_5$ calculated by the adder 93f.

The adder 93g adds $\Delta E_{y6}$ to the energy value $E_5$ stored in the E storage register 94g to update the energy value $E_5$. The E storage register 94g takes in the energy value $E_5$ calculated by the adder 93g.

The adder 93h adds $\Delta E_{y7}$ to the energy value E, stored in the E storage register 94h to update the energy value $E_7$. The E storage register 94h takes in the energy value $E_7$ calculated by the adder 93h.

Each of the E storage registers 94a, . . . , and 94h is, for example, a flip-flop.

Next, a circuit configuration example of the LFB 70a will be described. The LFBs 70b, . . . , and 70h have a similar circuit configuration to the LFB 70a.

Figure 19:
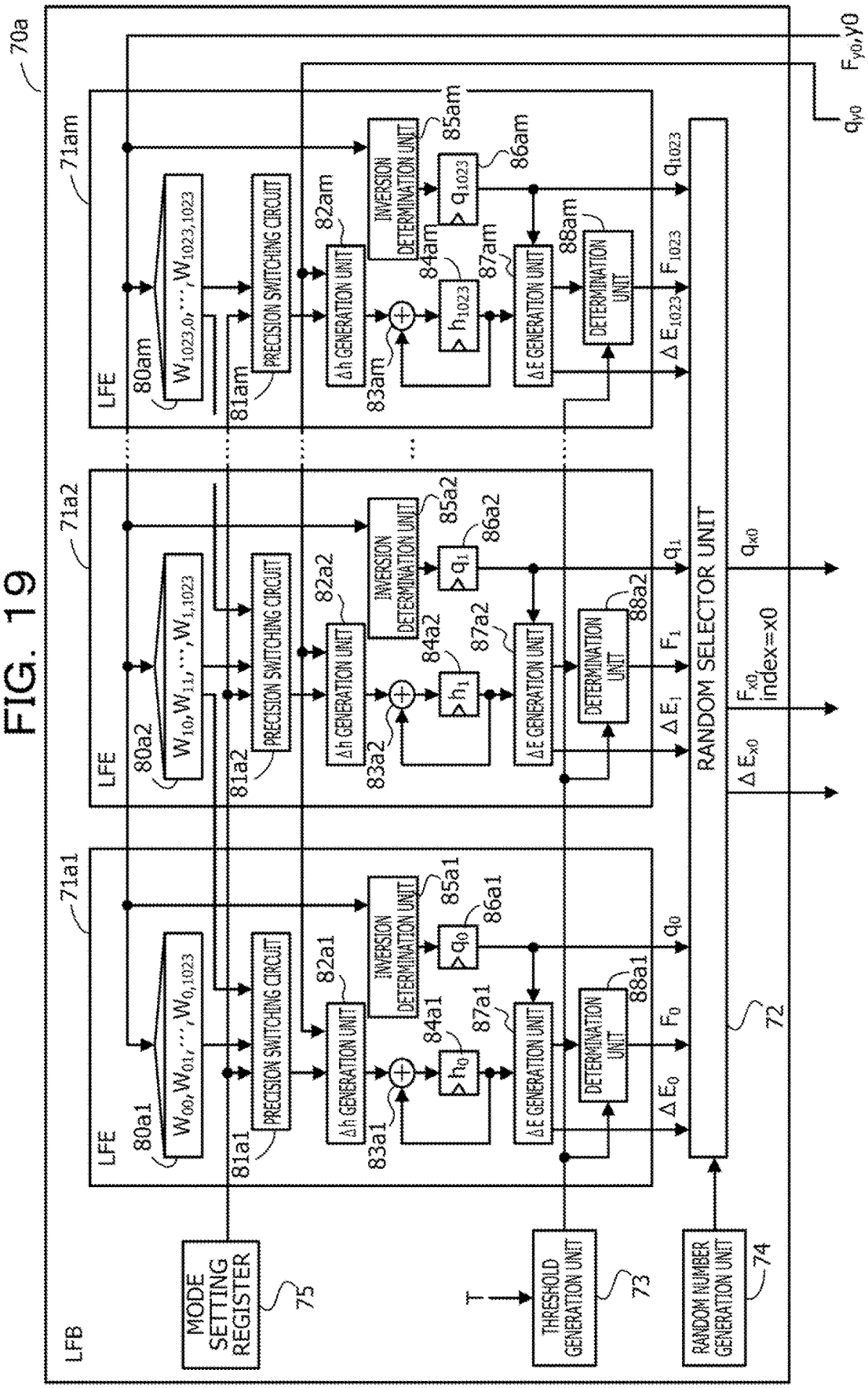
FIG. 19 is a diagram illustrating a circuit configuration example of an LFB.

FIG. 19 is a diagram illustrating a circuit configuration example of the LFB.

Each of the LFEs 71a1, 71a2, . . . , and 71am is used as one bit of spin bits. m is an integer of 2 or larger and represents the number of LFEs Included in the LFB 70a. In FIG. 19, m=1024 is set as an example. Note that m may be another value.

Identification information (index) is associated with each of the LFEs 71a1, 712, . . . , and 71am. For each of the LFEs 71a1, 71a2, . . . , and 71am, the index=0, 1, . . . , or 1023.

The circuit configuration of the LFE 71a1 will be described below. The LFEs 71a2, . . . , and 71am are implemented with a similar circuit configuration to the LFE 71a1. Regarding description of the circuit configurations of the LFEs 71a2, . . . , and 71am, the "a1" part at the end of the reference sign of each of the element in the following description is replaced with "a2", . . . , and "am", respectively (for example, the reference sign of "80a1" is replaced with "80am").

The LFE 71a1 includes an SRAM 80a1, a precision switching circuit 81a1, a $\Delta h$ generation unit 82a1, an adder 83a1, an h storage register 84a1, an inversion determination unit 85a1, a bit storage register 86a1, a $\Delta E$ generation unit 87a1, and a determination unit 88a1.

Here, the SRAM 80a1, the precision switching circuit 81a1, the $\Delta h$ generation unit 82a1, the adder 83a1, the h storage register 84a1, the inversion determination unit 85a1, the bit storage register 86a1, the $\Delta E$ generation unit 87a1, and the determination unit 88a1 have similar functions to the hardware with the same names described in FIG. 8, respectively. Note that the index=y0 and the flag $F_{y0}$ indicating inversion availability output by the scale coupling circuit 91 are supplied to the SRAM 80a1 (or the precision switching circuit 81a1) and the inversion determination unit 85a1. Furthermore, the inversion bit $q_{y0}$ output by the scale coupling circuit 91 is supplied to the $\Delta h$ generation unit 82a1.

The mode setting register 75 sets the number of bits (precision) of weight coefficients for the precision switching circuits 81a1, 81a2, . . . , and 81am. The mode setting register 75 does not have a signal line for setting the random selector unit 72 (however, the mode setting register 75 may have the signal line). In the third embodiment, as an example, the following five types of modes described in the second embodiment can be used.

The first mode is a 1-kbit scale/128-bit precision mode. The 1-kbit scale/128-bit precision mode uses one LFB. This mode can be implemented with only one of the LFBs 70a, . . . , and 70h.

The second mode is a 2-kbit scale/64-bit precision mode. The 2-kbit scale/64-bit precision mode uses two LFBs. For example, the mode can be Implemented by any one of a combination of the LFBs 70a and 70b, a combination of the LFBs 70c and 70d, a combination of the LFBs 70e and 70f, and a combination of the LFBs 70g and 70h.

The third mode is a 4-kbit scale/32-bit precision mode. The 4-kbit scale/32-bit precision mode uses four LFBs. For example, the mode can be implemented by either a combination of the LFBs 70a, 70b, 70c, and 70d or a combination of the LFBs 70e, 70f, 70g, and 70h.

The fourth mode is a 4-kbit scale/64-bit precision mode. The 4-kbit scale/64-bit precision mode uses eight LFBs. This mode can be implemented using a combination of the LFBs 70a, . . . , and 70h. Note that, as described in FIG. 17, the number of LFEs used in one LFB is half the number of LFEs included in one LFB.

The fifth mode is an 8-kbit scale/16-bit precision mode. The 8-kbit scale/16-bit precision mode uses eight LFBs. This mode can be implemented using a combination of the LFBs 70a, . . . , and 70h.

Furthermore, the optimization device 26 of the third embodiment enables the same problems or other problems to be executed in parallel by combining the above-described 1-kbit scale/128-bit precision mode, the 2-kbit scale/64-bit precision mode, and the 4-kbit scale/32-bit precision mode.

Therefore, the scale coupling circuit 91 selects, for the plurality of LFBs (combinations of the LFBs), the number of LFBs to be combined (the number of groups to be combined) to include the number of LFEs corresponding to the number of spin bits according to a change in the number of spin bits by the mode setting register 92. The scale coupling circuit 91 has, for example, the following circuit configuration.

Figure 20:
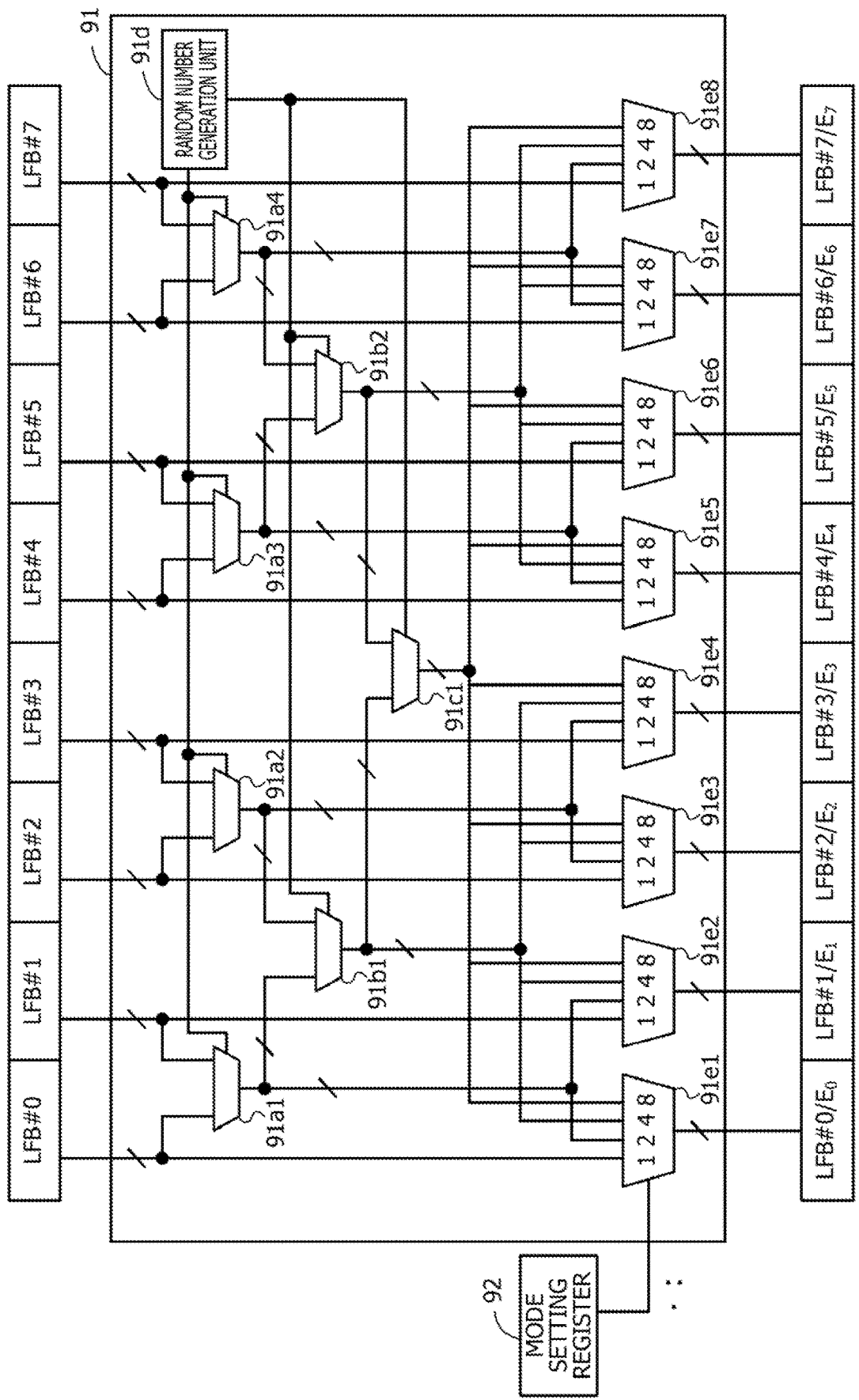
FIG. 20 is a diagram illustrating a circuit configuration example of a scale coupling circuit.

FIG. 20 is a diagram illustrating a circuit configuration example of a scale coupling circuit.

The scale coupling circuit 91 includes selection circuits 91a1, 91a2, 91a3, 91a4, 91b1, 91b2, and 91c1 connected in a tree shape over a plurality of stages, a random number generation unit 91d, and mode selection circuits 91e1, 91e2, 91e3, 91e4, 91e5, 91e6, 91e7, and 91e8.

Two sets (state signals) of variables $q_i$, $F_i$, $\Delta E_i$, and the index=i output by the LFBs 70a, . . . , and 70h are input to each of the selection circuits 91a1, . . . , and 91a4 in the first stage. For example, a set of ($q_{x0}$, $F_{x0}$, $\Delta E_{x0}$, the index=x0) output by the LFB 70a (#0) and a set of ($q_{x1}$, $F_{x1}$, $\Delta E_{x1}$, the index=x1) output by the LFB 70b (#1) are input to the selection circuit 91a1. Furthermore, a set of ($q_{x2}$, $F_{x2}$, $\Delta E_{x2}$, the index=x2) output by the LFB 70c (#2) and a set of ($q_{x3}$, $F_{x3}$, $\Delta E_{x3}$, the index=x3) output by the LFB 70d (#3) are input to the selection circuit 91a2. A set of ($q_{x4}$, $F_{x4}$, $\Delta E_{x4}$, the index=x4) output by the LFB 70e (#4) and a set of ($q_{x5}$, $F_{x5}$, $\Delta E_{x5}$, the index=x5) output by the LFB 70f (#5) are input to the selection circuit 91a3. A set of ($q_{x6}$, $F_{x6}$, $\Delta E_{x6}$, the index=x6) output by the LFB 70g (#6) and a set of ($q_{x7}$, $F_{x7}$, $\Delta E_{x7}$, the index=x7) output by the LFB 70h (#7) are input to the selection circuit 91a4.

Then, each of the selection circuits 91a1, . . . , and 91a4 selects a set of ($x_i$, $F_i$, $\Delta E_i$, the index=i) from the two sets on the basis of the 1-bit random number output by the random number generation unit 91d. At this time, each of the selection circuits 91a1, . . . , and 91a4 preferentially selects the set having $F_i$ of 1, or selects any one set on the basis of the 1-bit random number in the case where both the sets have $F_i$ of 1 (which similarly applies to the other selection circuits 91b1, 91b2, and 91c1). Here, the random number generation unit 91d individually generates the 1-bit random number for each selection circuit and supplies the 1-bit random number to each selection circuit. Furthermore, each of the selection circuits 91a1, . . . , and 91a4 generates an identification value Indicating which set has been selected on the basis of the index included in both sets, and outputs a state signal including the selected variables $q_i$, $F_i$, and $\Delta E_i$ and the identification value. Note that the identification value output by each of the selection circuits 91a1, . . . , and 91a4 is increased by 1 bit from the input index.

Two state signals output by the selection circuits 91a1, . . . , and 91a4 are input to each of the selection circuits 91b1 and 91b2 in the second stage. For example, the state signals output by the selection circuits 91a1 and 91a2 are input to the selection circuit 91b1, and the state signals output by the selection circuits 91a3 and 91a4 are input to the selection circuit 91b2.

Then, each of the selection circuits 91b1 and 91b2 selects one of the two state signals on the basis of the two state signals and the 1-bit random number output by the random number generation unit 91d. Furthermore, each of the selection circuits 91b1 and 91b2 updates the identification value included in the selected state signal by adding one bit to indicate which state signal has been selected, and outputs the selected state signal.

Two state signals output by the selection circuits 91b1 and 91b2 are input to the selection circuit 91c1 in the last stage. The selection circuit 91c1 selects one of the two state signals on the basis of the two state signals and the 1-bit random number output by the random number generation unit 91d. Furthermore, the selection circuit 91c1 updates the identification value included in the selected state signal by adding one bit to indicate which state signal has been selected, and outputs the selected state signal.

As described above, the identification value corresponds to the index. The scale coupling circuit 91 may output the index corresponding to the inversion bit by each selection circuit selecting the index input from each random selector unit, similarly to the variables $q_i$, $F_i$, and $\Delta E_i$. In this case, each random selector unit receives an index from each LFE together with the variable q and the flag F. It is conceivable that the control unit 25a sets the index according to the combination of LFBs for the predetermined index storage registers of each of the LFEs.

Each of the mode selection circuits 91e1, . . . , and 91e8 has an input terminal according to the scale (that is, 1-kbit, 2-kbit, 4-kbit, or 8-kbit). In the drawing, "1" illustrated in each of the mode selection circuits 91e1, . . . , and 91e8 represents the input terminal corresponding to the 1-kbit scale. The "2" represents the input terminal corresponding to the 2-kbit scale. The "4" represents the input terminal corresponding to the 4-kbit scale (note that 32-bit precision). The "8" represents the input terminal corresponding to the 8-kbit scale (or 4-kbit scale/64-bit precision).

The state signal output by the LFB 70a (#0) is input to the 1-kbit scale input terminal of the mode selection circuit 91e1. The state signal output by the LFB 70b (#1) is input to the 1-kbit scale input terminal of the mode selection circuit 91e2. The state signal output by the LFB 70c (#2) is input to the 1-kbit scale input terminal of the mode selection circuit 91e3. The state signal output by the LFB 70d (#3) is input to the 1-kbit scale input terminal of the mode selection circuit 91e4. The state signal output by the LFB 70e (#4) is input to the 1-kbit scale input terminal of the mode selection circuit 91e5. The state signal output by the LFB 70f (#5) is input to the 1-kbit scale input terminal of the mode selection circuit 91e6. The state signal output by the LFB 70g (#6) Is input to the 1-kbit scale input terminal of the mode selection circuit 91e7. The state signal output by the LFB 70h (#7) is input to the 1-kbit scale input terminal of the mode selection circuit 91e8.

The state signal output by the selection circuit 91a1 is input to the respective 2-kbit scale input terminals of the mode selection circuits 91e1 and 91e2. The state signal output by the selection circuit 91a2 is input to the respective 2-kbit scale input terminals of the mode selection circuits 91e3 and 91e4. The state signal output by the selection circuit 91a3 is input to the respective 2-kbit scale input terminals of the mode selection circuits 91e5 and 91e6. The state signal output by the selection circuit 91a4 is input to the respective 2-kbit scale input terminals of the mode selection circuits 91e7 and 91e8.

The state signal output by the selection circuit 91b1 is input to the respective 4-kbit scale input terminals of the mode selection circuits 91e1, 91e2, 91e3, and 91e4. The state signal output by the selection circuit 91b2 is input to the respective 4-kbit scale input terminals of the mode selection circuits 91e5, 91e6, 91e7, and 91e8.

The state signal output by the selection circuit 91c1 is input to the respective 8-kbit scale input terminals of the mode selection circuits 91e1, . . . , and 91e8.

Each of the mode selection circuits 91e1, . . . , and 91e8 receives the setting of the scale (the number of spin bits) by the mode setting register 92. Note that, in FIG. 20, the signal line for each of the mode selection circuits 91e2, . . . , and 91e8 from the mode setting register 92 is abbreviated by the notation of " . . . ". Each of the mode selection circuits 91e1, . . . , and 91e8 selects the state signal input to the input terminal according to the set scale, outputs $(x_j, F_j, \text{index}=j)$ to the LFBs 70a, . . . , and 70h, and outputs $\Delta E_j$ to the adders 93a, . . . , and 93h.

For example, the mode selection circuit 91e1 outputs $(x_{y0}, F_{y0}, \text{the index}=y0)$ to the LFB 70a and outputs $\Delta E_{y0}$ to the adder 93a. The adder 93a updates $E_0$ on the basis of $\Delta E_{y0}$. The mode selection circuit 91e2 outputs $(x_{y1}, F_{y1}, \text{the index}=y1)$ to the LFB 70b and outputs $\Delta E_{y1}$ to the adder 93b. The adder 93b updates $E_1$ on the basis of $\Delta E_{y1}$. The mode selection circuit 91e3 outputs $(x_{y2}, F_{y2}, \text{the index}=y2)$ to the LFB 70c and outputs $\Delta E_{y2}$ to the adder 93c. The adder 93c updates $E_2$ on the basis of $\Delta E_{y2}$. The mode selection circuit 91e4 outputs $(x_{y3}, F_{y3}, \text{the index}=y3)$ to the LFB 70d and outputs $\Delta E_{y3}$ to the adder 93d. The adder 93d updates $E_3$ on the basis of $\Delta E_{y3}$. The mode selection circuit 91e5 outputs $(x_{y4}, F_{y4}, \text{the index}=y4)$ to the LFB 70e and outputs $\Delta E_{y4}$ to the adder 93e. The adder 93e updates $E_4$ on the basis of $\Delta E_{y4}$. The mode selection circuit 91e6 outputs $(x_{y5}, F_{y5}, \text{the index}=y5)$ to the LFB 70f and outputs $\Delta E_{y5}$ to the adder 93f. The adder 93f updates $E_5$ on the basis of $\Delta E_{y5}$. The mode selection circuit 91e7 outputs $(x_{y6}, F_{y6}, \text{the index}=y6)$ to LFB 70g and outputs $\Delta E_{y6}$ to the adder 93g. The adder 93g updates $E_6$ on the basis of $\Delta E_{y6}$. The mode selection circuit 91e8 outputs $(x_{y7}, F_{y7}, \text{the index}=y7)$ to the LFB 70h and outputs $\Delta E_{y7}$ to the adder 93h. The adder 93h updates $E_7$ on the basis of $\Delta E_{y7}$.

That is, the optimization device 26 of the third embodiment Includes, for each LFB, the random selector unit that selects one of the bits on the basis of the signals indicating inversion availability output from the LFEs belonging to a certain LFB (group), and outputs the signal indicating the selected bit to the scale coupling circuit 91. The scale coupling circuit 91 combines one or more LFBs according to a change in the number of spin bits, and selects the bit to be inverted on the basis of the signals indicating the bit selected by the random selector unit corresponding to each of the one or more LFBs. The scale coupling circuit 91 outputs the signal indicating the bit to be inverted to the LFEs belonging to the one or more LFBs.

Here, the mode setting register 92 individually sets the scale for the mode selection circuits 91$e$1, . . . , and 91$e$8. Note that, in a mode of a certain scale, a common scale is set for the mode selection circuits corresponding to the LFBs used in combination.

For example, the mode setting register 92 may set the same number of bits or different numbers of bits for the number of spin bits of the first spin bit string corresponding to the first combination of LFBs and the number of spin bits of the second spin bit string corresponding to the second combination of LFBs. Furthermore, the mode setting register of each LFB including the mode setting register 75 may set the same number of bits or different numbers of bits for the number of bits of weight coefficients for the LFEs belonging to the first combination of LFBs and the number of bits of weight coefficients for the LFEs belonging to the second combination of LFBs.

For example, in the case of using the 2-kbit scale mode using the LFBs 70$a$ and 70$b$ in combination, the mode setting register 92 supplies a selection signal for selecting the 2-kbit scale mode to the mode selection circuits 91$e$1 and 91$e$2. At this time, for example, the optimization device 26 can execute the same problem as the operation by the LFBs 70$a$ and 70$b$ or a different problem in parallel, using the remaining six LFBs by the setting of the mode setting register 92. For example, the scale coupling circuit 91 may implement six 1-kbit scale modes in each of the six LFBs for the remaining six LFBs. Furthermore, the scale coupling circuit 91 may implement three 2-kbit scale modes by combining each two of the six LFBs. Moreover, the scale coupling circuit 91 may implement a 2-kbit scale mode by combining two of the six LFBs, and implement a 4-kbit scale mode by combining the other four LFBs.

Examples of the combination of modes implemented in parallel are not limited to the above combinations, and various combinations are conceivable such as a combination of eight 1-kbit scale modes, a combination of four 2-kbit scale modes, and a combination of four 1-kbit scale modes and two 2-kbit scale modes, for example.

In this way, the scale coupling circuit 91 receives the setting of the number of spin bits for each of the plurality of spin bit strings by the mode setting register 92, and selects the number of LFBs (the number of groups) to be combined for each of the numbers of spin bits of the plurality of spin bit strings, and combines the LFBs. As a result, a plurality of Ising models can be Implemented on one optimization device 26.

Note that common energy is stored in the set of E storage registers corresponding to the set of LFBs used in combination. For example, in the case of using the LFBs 70$a$ and 70$b$ in combination, $E_0$ and $E_1$ stored in the E storage registers 94$a$ and 94$b$ have the same value. In this case, when reading the energy value for the set of LFBs 70$a$ and 70$b$, the control unit 25$a$ may read the energy value stored in either one of the E storage registers 94$a$ and 94$b$ (for example, the E storage register 94$a$ corresponding to the LFB 70$a$) The control unit 25$a$ reads the energy value for other combinations of LFBs in a similar manner.

In the third embodiment, the control unit 25$a$ receives the input by the CPU 21 such as the initial values and operating conditions for each problem to be calculated in parallel as step S10 in FIG. 15. Then, in step S11, the control unit 25$a$ sets the scale/precision corresponding to each problem in the mode setting registers of the LFBs and the mode setting register 92 for each group of LFBs used for one problem.

For example, for the first problem, the control unit 25$a$ sets the 2-kbit scale/64-bit precision for the mode setting registers of the LFBs 70$a$ and 70$b$ and sets the mode setting register 92 to cause the mode selection circuits 91$e$1 and 91$e$2 to perform output for the 2-kbit scale. Furthermore, for the second problem, the control unit 25$a$ sets the 2-kbit scale/64-bit precision for the mode setting registers of the LFBs 70$c$ and 70$d$ and sets the mode setting register 92 to cause the mode selection circuits 91$e$3 and 91$e$4 to perform output for the 2-kbit scale.

In this case, the optimization device 26 can calculate two problems (or both problems may be the same problem) in parallel. Specifically, the control unit 25$a$ controls the LFBs to perform the procedure of the flowchart illustrated in FIG. 16 for the combination of the LFBs corresponding to each problem. For example, the control unit 25$a$ individually receives, for each problem, the initial values of various parameters such as the temperature parameter T, the weight coefficients, the number of bit updates and the number of temperature changes in a certain temperature parameter, and the like, inputs the received values to the LFBs belonging to the combination of LFBs that calculate the problem, and executes the operations in parallel by the combinations of LFBs.

After the operation is completed, the control unit 25$a$ reads the spin bit string for the first problem from the each of the LFEs of the LFBs 70$a$ and 70$b$, and sets the spin bit string as the solution of the first problem. Furthermore, after the operation is completed, the control unit 25$a$ reads the spin bit string for the second problem from the each of the LFEs of the LFBs 70$c$ and 70$d$, and sets the spin bit string as the solution of the second problem. Three or more problems can be calculated in parallel in a similar manner. As a result, operations for a plurality of problems can be efficiently executed.

Furthermore, in the case of solving the same problem in parallel by a plurality of sets of LFBs, it is conceivable that the control unit 25$a$ speeds up the operation by, for example, a method called replica exchange method. In the replica exchange method, the search for a solution is speeded up by updating the spin bit string with a different temperature parameter in each set of LFBs (each replica) and exchanging the temperature parameters between the sets of LFBs (that is, between replicas) with a predetermined probability after a predetermined number of updates.

Alternatively, as a method of searching for a solution, a method of repeating the procedure from the start to the end in FIG. 16 and obtaining the spin bit string of the minimum energy from among a plurality of operation results as the solution is conceivable. In this case, the control unit 25$a$ can reduce the above-described number of repetitions and speed up the operation by solving the same problem using a plurality of sets of LFBs in parallel.

By the way, as the optimization problems that can be calculated using the optimization devices 25 and 26 illustrated in the second and third embodiments, problems in various fields are conceivable. For example, the scale of the problem required and the precision of expression of the problem may change depending on the field such as academic discipline or industry.

Figure 21:
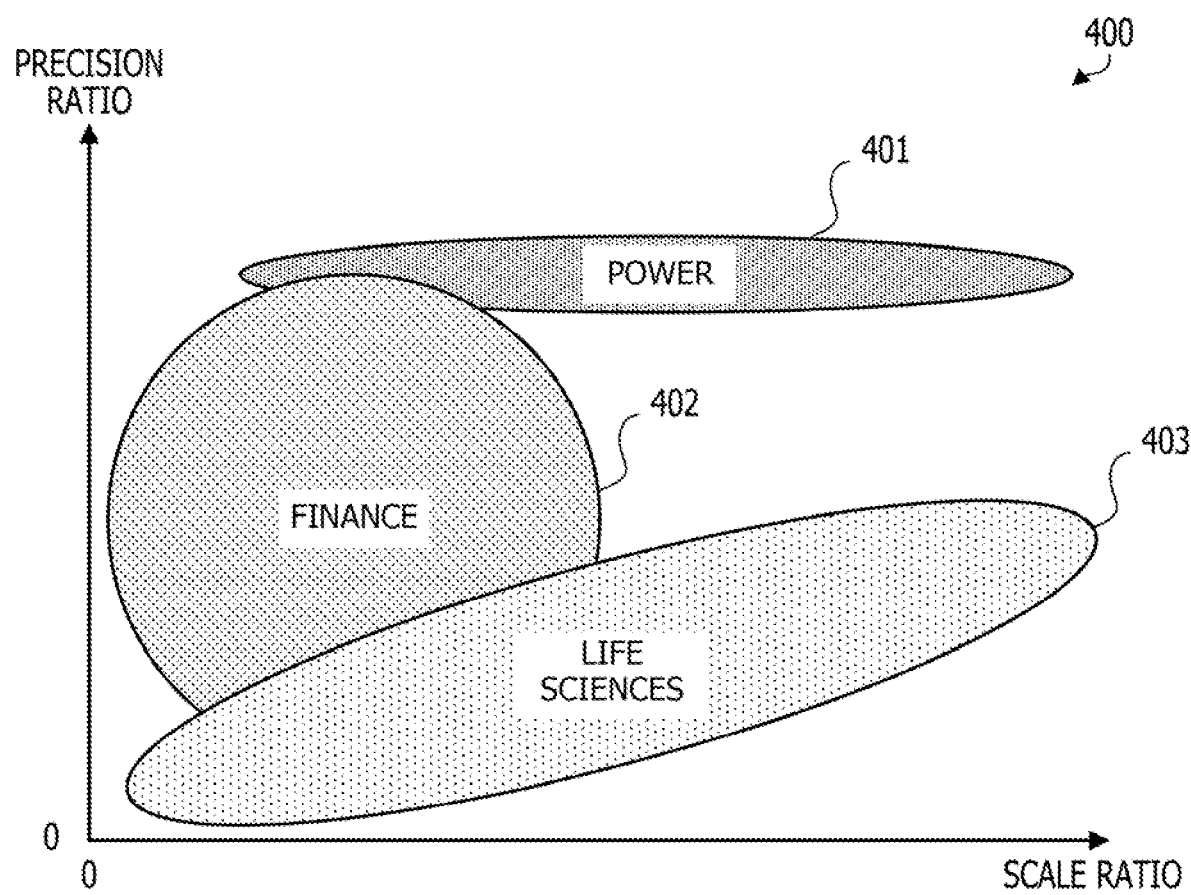
FIG. 21 is a diagram illustrating an example of a required range of scale/precision for each problem.

FIG. 21 is a diagram illustrating an example of a required range of scale/precision for each problem.

Graph 400 illustrates ranges of scale and precision required for problems in three types of fields, where the horizontal axis represents a scale ratio (a degree indicating the magnitude of scale) and the vertical axis represents a precision ratio (a degree indicating the magnitude of precision). The scale ratio is a ratio of a scale value (the number of spin bits) actually required to a scale reference value that is a reference of scale. The precision ratio is a ratio of a precision value (the number of bits of coupling coefficients) actually required to a precision reference value that is a reference of precision.

Region 401 illustrates the range of scale ratio/precision ratio required for problems in the field of power. Region 402 illustrates the range of scale ratio/precision ratio required for problems in the field of finance. Region 403 illustrates the range of scale ratio/precision ratio required for problems in the field of life sciences.

For example, according to the region 401, problems in the field of power often require a relatively high precision ratio. Furthermore, according to the region 402, problems in the field of finance require a relatively small scale ratio but may require a relatively high precision ratio. Furthermore, in the field of life science, problems require a relatively low precision ratio but may require a relatively large scale ratio. Note that the scale ratio/precision ratio required in each field described here is an example, and the required range of scale ratio/precision ratio may vary according to the problems dealt with in each field in the future.

Meanwhile, it is also conceivable to manufacture an optimization device suitable for the scale and precision for each problem, but it is not efficient.

Therefore, in the second or third embodiment, combinatorial optimization problems in various fields can be dealt with by making it possible to implement various scale/precision modes by the one-chip optimization device 25 or 26.

Figure 22:
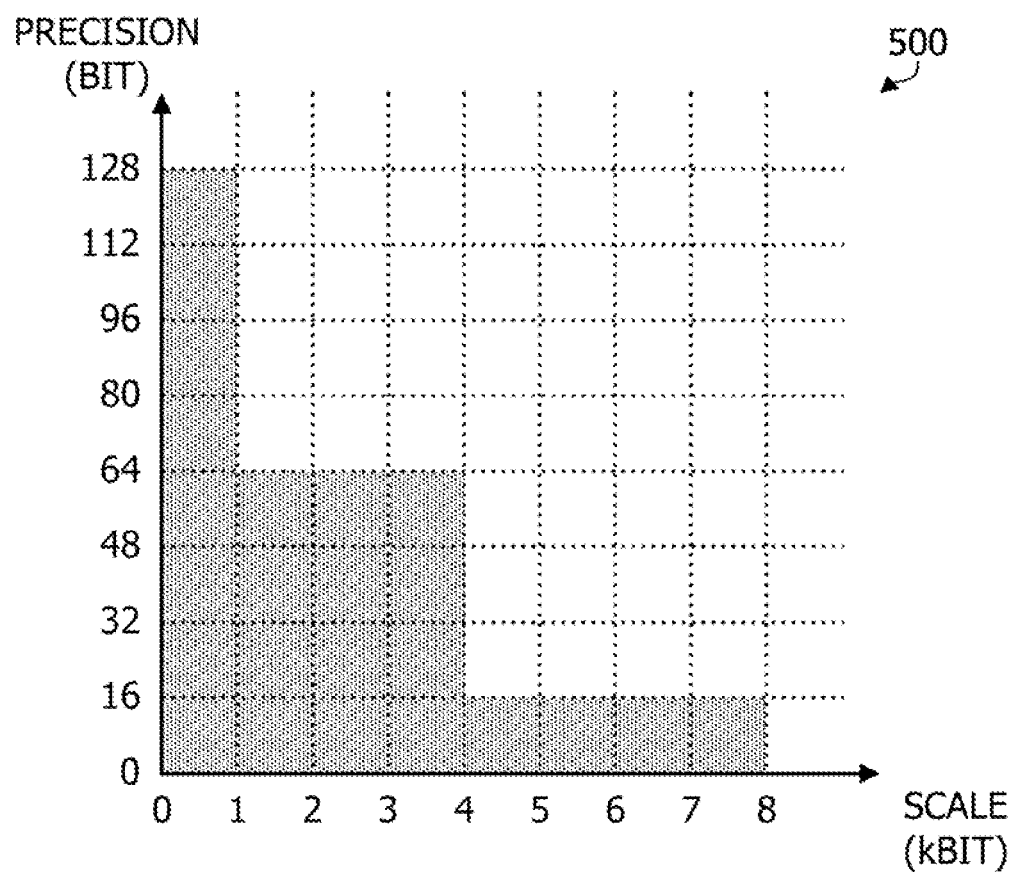
FIG. 22 is a diagram illustrating an example of a selectable range of scale precision.

FIG. 22 is a diagram illustrating an example of a selectable range of scale and precision.

Graph 500 illustrates an example of a selectable range of scale and precision that can be implemented by the optimization device 25 or 26. Here, it is assumed that the upper limit of the capacity reserved for storing the weight coefficient in the SRAM for each LFE is 128 kbits, and the number of LFEs in each of the optimization device 25 and 26 is n=8192. As described above, the optimization devices 25 and 26 can implement, for example, five types of modes. Note that, in a range illustrated with the hatched area in the graph 500, another scale/precision mode may be used. By increasing the SRAM capacity for each LFE, even larger scale/precision modes can be implemented.

In the optimization device 25 or 26, various use patterns of the each of the LFEs are implemented after making the scale/precision mode variable.

Figure 23A:
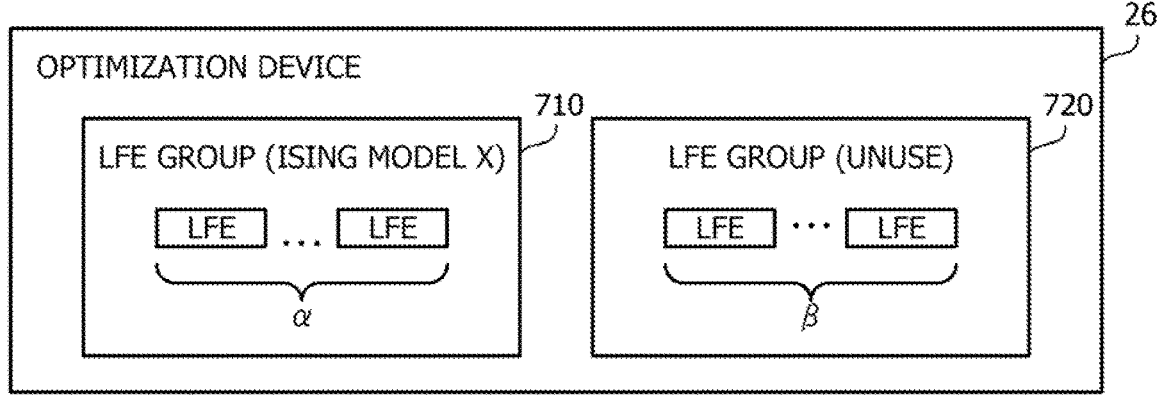
FIGS. 23A to 23C are diagrams illustrating examples of LFE use patterns.
Figure 23B:
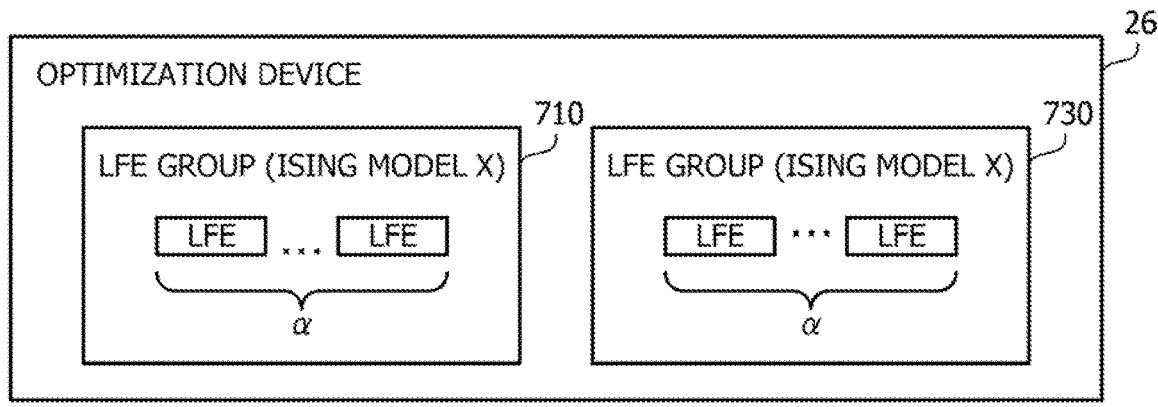
Figure 23C:
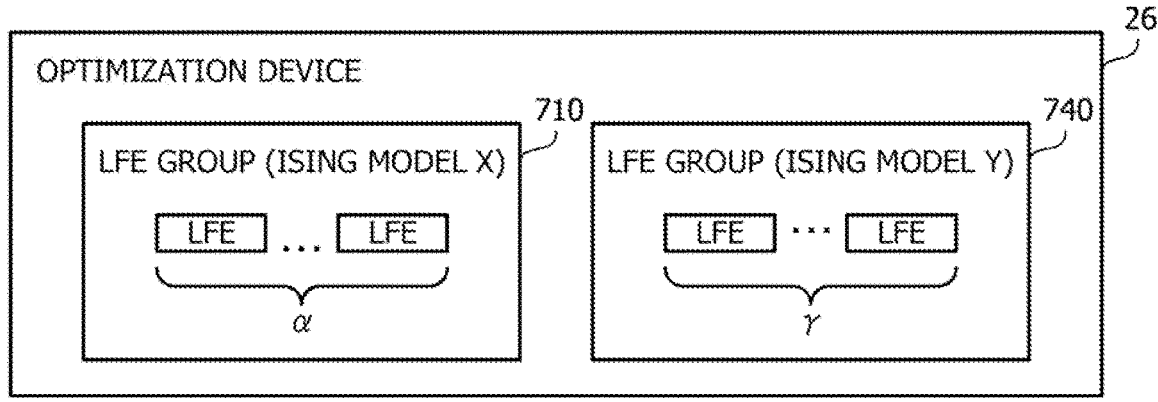

FIGS. 23A to 23C are diagrams illustrating examples of LFE use patterns.

FIG. 23A illustrates an example (No. 1) of a use pattern of n LFEs that can be implemented in the second or third embodiment. For example, the optimization device 26 implements a first Ising model X using an LFE group 710 (that is, the first combination of LFBs) including a LFEs of the n LFEs. Furthermore, the optimization device 26 does not use an LFE group 720 including the remaining β LFEs. Similarly, the optimization device 25 may implement the first Ising model X using the LFE group 710 and does not use the LFE group 720.

FIG. 23B illustrates an example (No. 2) of a use pattern of n LFEs that can be implemented in the third embodiment. For example, the optimization device 26 implements the first Ising model X using the LFE group 710 (that is, the first combination of LFBs) including α LFEs of the n LFEs. Furthermore, the optimization device 26 implements the first Ising model X using an LFE group 730 (that is, the second combination of LFBs) including a LFEs of the remaining LFEs. By increasing the degree of parallelism of operations for the same problem, it is possible to accelerate convergence of the solution and speed up the operations.

FIG. 23C illustrates an example (No. 3) of a use pattern of n LFEs that can be implemented in the third embodiment. For example, the optimization device 26 implements the first Ising model X using the LFE group 710 (that is, the first combination of LFBs) including α LFEs of the n LFEs. Furthermore, the optimization device 26 implements a second Ising model Y using an LFE group 740 (that is, the second combination of LFBs) including γ (may be γ=α or γ≠α) LFEs of the remaining LFEs. Thereby, different problems can be calculated in parallel.

Next, an example of a use flow of the optimization device 26 by the user will be described. Hereinafter, the optimization device 26 will be mainly illustrated, but a similar use flow is applied to the optimization device 25 as well.

Figure 24:
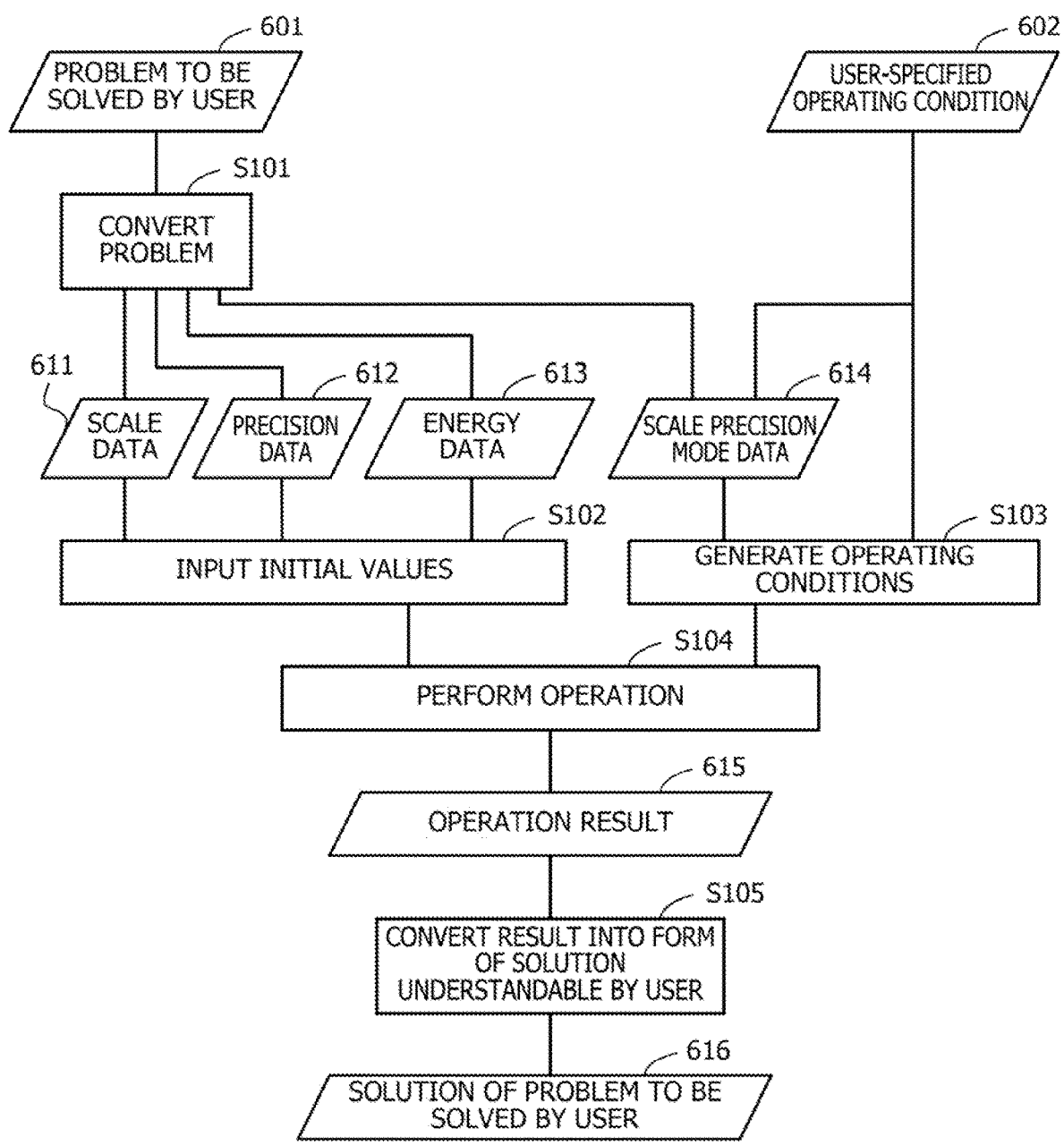
FIG. 24 is a diagram illustrating an example of a use flow of the optimization device.

FIG. 24 is a diagram illustrating an example of a use flow of the optimization device.

(S101) The CPU 21 receives data 601 indicating a problem to be solved by a user from the client 30 via the NIC 24. The client 30 and the NIC 24 implement an input unit that inputs various data to the information processing device 20 and a notification unit that notifies a solution obtained as a result of a ground state search as result information that can be easily understood by the user. The CPU 21 converts the data 601 into a search problem for the ground state of an Ising model, using the function of the library 21a. As a result, the CPU 21 generates scale data 611 indicating the scale (the number of spin bits) of the problem, precision data 612 indicating the precision of expression of the problem, energy data 613 indicating the initial value of energy, and scale precision mode data 614 according to the scale/precision. The scale data 611 may be binary data indicating the spin bit string. The precision data 612 may include the weight coefficient between spin bits represented by the precision. The CPU 21 determines an appropriate scale precision mode from the problem and generates scale precision mode data 614.

(S102) The CPU 21 inputs the scale data 611, the precision data 612, and the energy data 613 to the control unit 25a as initial values.

(S103) CPU 21 receives the input of user-specified operating conditions 602. The user-specified operating conditions 602 include, for example, the number of state updates in a certain temperature parameter, the number of updates of the temperature parameter, the range of reduction in the temperature parameter, the initial value of the temperature parameter, and the like. Furthermore, the user-specified operating conditions 602 may include the number of LFBs to be combined. The CPU 21 includes the number of LFBs to be combined in the scale precision mode data 614. The CPU 21 inputs the scale precision mode data 614 and the user-specified operating conditions 602 to the control unit 25a as operating conditions. The scale precision mode data 614 is set in the mode setting registers of each LFE including the mode setting register 75 and the mode setting register 92.

(S104) When steps S102 and S103 are completed, the CPU 21 instructs the control unit 25a to start executing the operation for searching for the ground state.

(S105) When the operation by the optimization device 26 is completed, the CPU 21 acquires an operation result 615 from the optimization device 26 and converts the operation result into result information (for example, information on a result display screen) that can be easily understood by the user. The CPU 21 transmits the converted result information to the client 30 as a solution 616 of the problem to be solved by the user.

In this way, the CPU 21 determines the number of spin bits and the number of bits of weight coefficients according to the problem input by the user. The control unit 25a receives information indicating the number of spin bits, the number of bits of weight coefficients, and the weight coefficients from the CPU 21. The control unit 25a sets the number of spin bits and the number of bits of weight coefficients in the mode setting register 55 (or the mode setting registers 75 and 92). The control unit 25a stores the information in the SRAMs of the number of LFEs corresponding to the number of spin bits, respectively.

In this way, the user can execute the operation by the optimization device 25 or 26 with the scale/precision according to the problem to be solved by the user. For example, the optimization device 26 can calculate the same problem or different problems by the same user in parallel. Furthermore, the optimization device 26 can calculate different problems by different users in parallel. That is, by enabling the operation with appropriate scale/precision according to the problem to be solved, another problem can be calculated in parallel using a free LFB (or free LFEs). Furthermore, the one-chip optimization devices 25 and 26 can be shared by a plurality of users. Moreover, the one-chip optimization devices 25 and 26 can be shared by a plurality of problems.

Furthermore, an optimization device (or an optimization system) having the above-described functions is conceivable. The optimization device (or optimization system) includes the input unit, the conversion unit, the control unit, and the display unit.

The input unit inputs a problem to be solved and an operating conditions. The input unit may be, for example, an input device such as a mouse or a keyboard, or may be implemented by an NIC (for example, NIC 24) and a client terminal (for example, client 30).

The conversion unit converts the input problem into a search problem in a ground state of an Ising model, and generates scale information indicating a scale of the search problem, precision information indicating precision of expression of the search problem, energy information indicating an initial value of energy of the search problem, and scale precision mode Information according to the scale and precision. The conversion unit may be, for example, a processor such as a CPU (for example, CPU 21) that exhibits the functions of the library 21a and the driver 21b. The conversion unit may be implemented by a semiconductor integrated circuit such as an FPGA.

The control unit inputs the scale information, the precision information, and the energy information (or the initial value of the spin bit string, the coupling coefficients, and the initial value of energy according to the scale information, the precision information, and the energy information) and inputs the operating conditions and the scale precision mode information, and executes the operation for searching for the ground state and outputs the solution. The control unit may be, for example, the control unit 25a that inputs the scale information, the precision information, and the energy information (or the initial value of the spin bit string, the coupling coefficients, and the initial value of energy according to the scale information, the precision information, and the energy information) and inputs the operating conditions and the scale precision mode information to the LFB 50 (or LFBs 70a, . . . , and 70h) and executes the operation for searching for the ground state using the LFB and outputs the solution. The control unit may be, for example, a semiconductor chip including the control unit 25a and the LFB 50 (or LFBs 70a, . . . , and 70h), and may be a semiconductor chip that searches for the ground state of the Ising model. That is, the control unit may be a semiconductor chip that executes the operation for searching for the ground state of the Ising model and outputs the solution on the basis of the scale information, precision information, and energy information (or the spin bit string of the number of bits according to the scale information, the coupling coefficients of the number of bits according to the precision information, and the initial value of energy according to the energy information), the operating conditions, and the scale precision mode information. The scale information may be represented by the scale ratio to the scale reference value that is a reference of scale. The precision information may be represented by the precision ratio to the precision reference value that is a reference of precision.

The display unit displays the solution obtained as a result of the search for the ground state by the control unit. The display unit may be a display or may be implemented by a NIC and a client terminal. For example, the conversion unit converts the solution obtained as a result of the search for the ground state into visualized display information. The display unit displays the visualized display information.

The scale/precision can be varied by the illustrated optimization device. The user can execute the operation by the optimization device with the scale/precision according to the problem to be solved.

Note that the control of the optimization device 1 according to the first embodiment may be implemented by executing the program by the processor included in the computer that controls the optimization device 1. For example, the program is stored in the RAM of the computer. The control of the optimization devices 25 and 26 according to the second and third embodiments may be implemented by causing the CPU 21 to execute the program. The program can be recorded in the computer-readable recording medium 41.

For example, the program can be distributed by distributing the recording medium 41 in which the program is recorded. Alternatively, the program may be stored in another computer and distributed via a network. For example, a computer may store (install) the program, which is recorded in the recording medium 41 or received from another computer, in the DRAM 22 or the storage device 23, read the program from the DRAM 22 or the storage device 23, and execute the program.

The above description merely describes the principle of the present invention. Moreover, numerous modifications and variations are able to be made by those skilled in the art, and the present invention is not limited to the above-described or illustrated exact configuration and application example, and all corresponding modifications and equivalents are regarded to fall within the scope of the present invention by appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device for determining suitable setting based on an input problem, comprising:
a memory; and
a processor coupled to the memory and configured to:
store a coefficient indicating magnitude of an interaction between bits in a bit string representing a state of an Ising model;
output, when any bit in the bit string is inverted, a signal indicating inversion availability of an own bit according to calculation of energy change in the Ising model using the coefficient corresponding to the inverted bit and the own bit read from the memory as a plurality of bit operations;
receives an input of information indicating first number of bits and second number of bits by an operation unit that determines the first number of bits and the second number of bits according to the input problem, and input the first number of bits and the second number of bits to a setting change unit;
output a signal indicating a bit to be inverted in the bit string selected on the basis of the signal indicating inversion availability output from each of bit operations of the first number of bits of the bit string, of the plurality of bit operations, to each of the bit operations of the first number of bits; and
change the first number of bits and change the second number of bits of the coefficient for each of the bit operations of the first number of bits.

2. The optimization device according to claim 1, wherein the processor, for each of the plurality of bit operations, changes the second number of bits of the coefficient to be read from the memory according to the change in the second number of bits.

3. The optimization device according to claim 2, wherein the memory includes a memory area for each of the plurality of bit operations, and
the processor reads a part of coefficients regarding the own bit and other bits from the memory area for another bit operation not used for the bit string, of the plurality of bit operations, according to the change in the second number of bits.

4. The optimization device according to claim 1, wherein the plurality of bit operations is divided into a plurality of groups, and
the processor combines one or more groups to include the bit operation of the first number of bits, of the plurality of bit operations, according to the change in the first number of bits.

5. The optimization device according to claim 4, wherein the processor, for each of the plurality of groups, outputs the signal indicating a bit selected on the basis of the signals indicating inversion availability output from the bit operations belonging to one group, and
outputs, to the bit operations belonging to the one or more groups, the signal indicating the bit to be inverted selected on the basis of the signal indicating a bit corresponding to each of the one or more groups.

6. The optimization device according to claim 4, wherein the processor receives a setting of the first number of bits for each of a plurality of the bit strings, and combines the one or more groups for each of the plurality of bit strings.

7. The optimization device according to claim 6, wherein:
the processor executes an operation for the Ising model by a first combination and an operation for the Ising model by a second combination or for another Ising model, of a plurality of combinations of groups, in parallel.

8. The optimization device according to claim 6, wherein the processor sets the first number of bits of a first bit string corresponding to a first combination and the first number of bits of a second bit string corresponding to a second combination, of a plurality of combinations of groups, to a same number of bits or different numbers of bits.

9. The optimization device according to claim 6, wherein the processor sets the second number of bits of a bit operation belonging to a first combination and the second number of bits of a bit operation belonging to a second combination, of a plurality of combinations of groups, to a same number of bits or different numbers of bits.

10. The optimization device according to claim 1, wherein the processor forcibly sets the signal indicating inversion availability output by another bit operation other than the bit operations of the first number of bits, of the plurality of bit operation, to be inversion unavailable, and outputs the signal indicating a bit to be inverted selected on the basis of the signals indicating inversion availability output of the first number of bits and the signal set to be inversion unavailable set for the another bit operation not only to the bit operations of the first number of bits but also to the another bit operation.

11. An optimization device control method for determining suitable setting based on an input problem, comprising:
by a plurality of bit operation circuits included in the optimization device, when any bit in a bit string representing a state of an Ising model is inverted, outputting a signal indicating inversion availability of an own bit according to calculation of energy change in the Ising model, using a coefficient corresponding to the inverted bit, the coefficient indicating magnitude of an interaction between the own bit and another bit in the bit string and being read from a storage unit that stores the coefficient;
by the plurality of bit operation circuits included in the optimization device, receiving an input of information indicating first number of bits and second number of bits that determines the first number of bits and the second number of bits according to the input problem, and inputting the first number of bits and the second number of bits to a setting change unit included in the optimization device;
by a selection circuit unit included in the optimization device, outputting a signal indicating a bit to be inverted in the bit string selected on the basis of the signal indicating inversion availability output from each of bit operation circuits of the first number of bits of the bit string, of the plurality of bit operation circuits, to each of the bit operation circuits of the first number of bits; and
by a setting change unit included in the optimization device, changing the first number of bits for the selection circuit unit and changing the second number of bits of the coefficient for each of the bit operation circuits of the first number of bits.

12. A non-transitory computer-readable recording medium recording an optimization device control program for determining suitable setting based on an input problem, causing:

a plurality of bit operation circuits included in the optimization device to output, when any bit in a bit string representing a state of an Ising model is inverted, a signal indicating inversion availability of an own bit according to calculation of energy change in the Ising model, using a coefficient corresponding to the inverted bit, the coefficient indicating magnitude of an interaction between the own bit and another bit in the bit string and being read from a storage unit that stores the coefficient;

the plurality of bit operation circuits included in the optimization device to receive an input of information indicating first number of bits and second number of bits that determines the first number of bits and the second number of bits according to the input problem, and inputting the first number of bits and the second number of bits to a setting change unit included in the optimization device;

a selection circuit unit included in the optimization device to output a signal indicating a bit to be inverted in the bit string selected on the basis of the signal indicating inversion availability output from each of bit operation circuits of the first number of bits of the bit string, of the plurality of bit operation circuits, to each of the bit operation circuits of the first number of bits; and a setting change unit included in the optimization device to change the first number of bits for the selection circuit unit and change the second number of bits of the coefficient for each of the bit operation circuits of the first number of bits.

* * * * *